United States Patent
Yokogi et al.

(10) Patent No.: US 9,120,910 B2
(45) Date of Patent: Sep. 1, 2015

(54) POLYCARBONATE RESIN COMPOSITIONS AND MOLDED ARTICLES

(71) Applicants: Masashi Yokogi, Fukuoda (JP); Michiaki Fuji, Mie (JP); Masanori Yamamoto, Fukuoka (JP)

(72) Inventors: Masashi Yokogi, Fukuoda (JP); Michiaki Fuji, Mie (JP); Masanori Yamamoto, Fukuoka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 13/727,361

(22) Filed: Dec. 26, 2012

(65) Prior Publication Data

US 2013/0116365 A1 May 9, 2013

Related U.S. Application Data

(63) Continuation of application No. PCT/JP2011/064562, filed on Jun. 24, 2011.

(30) Foreign Application Priority Data

Jun. 25, 2010 (JP) .................. 2010-145094
Mar. 1, 2011 (JP) .................. 2011-043989
Mar. 28, 2011 (JP) .................. 2011-069428

(51) Int. Cl.
| | |
|---|---|
| C08K 5/07 | (2006.01) |
| C08K 5/52 | (2006.01) |
| C08K 5/134 | (2006.01) |
| C08K 5/3435 | (2006.01) |
| C08G 64/02 | (2006.01) |
| C08G 64/18 | (2006.01) |
| C08L 69/00 | (2006.01) |
| C08K 5/00 | (2006.01) |
| C08K 5/526 | (2006.01) |

(52) U.S. Cl.
CPC .............. *C08K 5/07* (2013.01); *C08G 64/0208* (2013.01); *C08G 64/183* (2013.01); *C08K 5/0041* (2013.01); *C08K 5/1345* (2013.01); *C08K 5/3435* (2013.01); *C08K 5/52* (2013.01); *C08K 5/526* (2013.01); *C08L 69/00* (2013.01)

(58) Field of Classification Search
CPC .......... C08K 5/07; C08K 5/3435; C08K 5/52; C08K 5/1345; C08K 5/526; C08L 69/00; C08G 64/0208; C08G 64/183
USPC .......................................... 524/102, 151, 358
See application file for complete search history.

(56) References Cited

U.S. PATENT DOCUMENTS

| | | | |
|---|---|---|---|
| 8,008,381 B2 | 8/2011 | Miyake et al. | |
| 2010/0076130 A1 | 3/2010 | Miyake et al. | |
| 2010/0190953 A1* | 7/2010 | Fuji et al. | 528/370 |
| 2011/0003101 A1* | 1/2011 | Fuji et al. | 428/35.7 |
| 2012/0245266 A1 | 9/2012 | Yokogi et al. | |
| 2012/0328855 A1 | 12/2012 | Yokogi et al. | |

FOREIGN PATENT DOCUMENTS

| | | |
|---|---|---|
| CN | 101448871 A | 6/2009 |
| JP | 2006-028441 | 2/2006 |
| JP | 2006-232897 | 9/2006 |
| JP | 2008-024919 | 2/2008 |
| JP | 2008-291055 | 12/2008 |
| JP | 2009-61762 A | 3/2009 |
| JP | 2009-091404 | 4/2009 |
| JP | 2009-091417 | 4/2009 |
| JP | 2009-142404 | 7/2009 |
| JP | 2009-144013 | 7/2009 |
| JP | 2009-144014 | 7/2009 |
| JP | 2009-144020 | 7/2009 |
| JP | 2009161746 A * | 7/2009 |
| WO | 2004/111106 | 12/2004 |
| WO | 2007/148604 | 12/2007 |

(Continued)

OTHER PUBLICATIONS

International Search Report issued Sep. 13, 2011 in PCT/JP2011/064562 filed Jun. 24, 2011.

(Continued)

*Primary Examiner* — Kriellion Sanders
(74) *Attorney, Agent, or Firm* — Oblon, McClelland, Maier & Neustadt, L.L.P.

(57) ABSTRACT

The invention provides polycarbonate resins which are excellent in terms of light resistance, transparency, hue, heat resistance, thermal stability, and mechanical strength. The invention relates to a polycarbonate resin composition containing: a polycarbonate resin at least containing structural units derived from a dihydroxy compound having the portion represented by the following formula (1) as part of the structure thereof; and a bluing agent. The invention further relates to a polycarbonate resin composition including: a polycarbonate resin (A) containing structural units derived from a dihydroxy compound represented by the following formula (2) as part of the structure thereof; and a bluing agent.

$$-\!\!+\!\!CH_2\!-\!\!O\!\!+\!\!- \qquad (1)$$

The case where the portion represented by the general formula (1) constitutes $-CH_2-O-H$ is excluded.

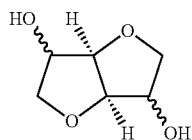

(2)

20 Claims, No Drawings

(56) References Cited

FOREIGN PATENT DOCUMENTS

| WO | 2008/133342 A1 | 11/2008 |
|---|---|---|
| WO | WO 2008/146400 A1 | 12/2008 |
| WO | 2009/075304 | 6/2009 |
| WO | 2011/065505 | 6/2011 |

OTHER PUBLICATIONS

Porikaboneto Jushi Handobukku, (published by The Nikkan Kogyo Shinbun, Ltd., Aug. 28, 1992; edited by HONMA Seiichi.
U.S. Appl. No 13/872,750, filed Apr. 29, 2013, Yokogi, et al.
U.S. Appl. No. 13/740,548, filed Jan. 14, 2013, Yokogi, et al.
U.S. Appl. No. 13/680,696, filed Nov. 19, 2012, Yokogi, et al.
U.S. Appl. No. 13/970,205, filed Aug. 19, 2013, Yokogi, et al.
Office Action issued Sep. 17, 2013, in Japanese Patent Application No. 2011-197534 with English translation.
U.S. Appl. No. 14/041,397, filed Sep. 30, 2013, Yokogi, et al.
Notification of Reasons for Refusal issued Jan. 21, 2014 in Japanese Patent Application No. 2011-197534 (with English translation).
Combined Office Action and Search Report issued Dec. 18, 2013 in Chinese patent Application No. 201180029680.4 (with English translation and English translation of category of cited documents).
Notification issued Apr. 22, 2014, in Japanese Patent Application No. 2011-197534 filed Sep. 9, 2011 (with English translation).
Office Action issued Jun. 10, 2014, in Japanese Patent Application No. 2011-197534 filed Sep. 9, 2011 (with English translation).
Office Action issued May 7, 2015, in Chinese Patent Application No. 201180029680.4 filed Jun. 24, 2011 (with English translation).
Office Action issued Jun. 9, 2015, in Japanese Patent Application No. 2011-141061, filed Jun. 24, 2011 (with English Translation).

\* cited by examiner

POLYCARBONATE RESIN COMPOSITIONS AND MOLDED ARTICLES

TECHNICAL FIELD

The present invention relates to polycarbonate resin compositions and molded polycarbonate resin articles obtained from the polycarbonate resin compositions.

BACKGROUND ART

Polycarbonate resins are generally produced using bisphenols as a monomer ingredient, and are being extensively utilized as so-called engineering plastics in the fields of electrical and electronic parts, automotive parts, medical parts, building materials, films, sheets, bottles, optical recording media, lenses, etc. so as to take advantage of the superiority thereof such as transparency, heat resistance, and mechanical strength.

However, the bisphenol compounds used for the conventional polycarbonate resins have aromatic ring structures and, hence, show enhanced ultraviolet absorption. Because of this, the polycarbonate resins have impaired light resistance and deteriorate in hue, transparency, or mechanical strength when used in places where the resins are exposed to ultraviolet rays or visible light over a long period. There have hence been limitations on outdoor use thereof and on use thereof in the vicinity of illuminators.

Techniques in which a benzophenone-based ultraviolet absorber, benzotriazole-based ultraviolet absorber, or benzoxazine-based ultraviolet absorber is added to a polycarbonate resin in order to overcome such problems are widely known (for example, non-patent document 1).

Meanwhile, when a polycarbonate resin which has monomer units of an aliphatic dihydroxy compound or alicyclic dihydroxy compound that has no aromatic ring structure in the molecular framework or monomer units of a cyclic dihydroxy compound that has ether bonds in the molecule, such as isosorbide, is used as the polycarbonate resin, it is theoretically expected that light resistance is improved.

In particular, polycarbonate resins produced using, as a monomer, isosorbide obtained from biomass resources have excellent heat resistance or mechanical strength, and many investigations thereon hence have come to be made in recent years (for example, patent documents 1 to 6).

PRIOR-ART DOCUMENTS

Patent Documents

Patent Document 1: International Publication No. 04/111106
Patent Document 2: JP-A-2006-232897
Patent Document 3: JP-A-2006-28441
Patent Document 4: JP-A-2008-24919
Patent Document 5: JP-A-2009-91404
Patent Document 6: JP-A-2009-91417

Non-Patent Document

Non-Patent Document 1: Porikābonēto Jushi Handobukku, (published by The Nikkan Kogyo Shinbun, Ltd., Aug. 28, 1992; edited by HONMA Seiichi)

SUMMARY OF THE INVENTION

Problems that the Invention is to Solve

However, addition of the ultraviolet absorbers shown in non-patent document 1 poses the following problems although the addition brings about improvements in hue retention through ultraviolet irradiation, etc. Namely, there have been problems, for example, that the addition of the ultraviolet absorbers deteriorates the hue, heat resistance, or transparency which is inherent in the resin and that the ultraviolet absorbers volatilize during molding to foul the mold.

Furthermore, since the aliphatic dihydroxy compound or alicyclic dihydroxy compound or the cyclic dihydroxy compound having ether bonds in the molecule, such as isosorbide, has no phenolic hydroxyl group, it is difficult to polymerize these compounds by the interfacial process which is widely known as a process for polycarbonate resin production using bisphenol A as a starting material. Usually, polycarbonate resins are produced from those compounds by the process which is called a transesterification process or a melt process. In this process, any of those dihydroxy compounds and a carbonic diester, e.g., diphenyl carbonate, are subjected to transesterification at a high temperature of 200° C. or above in the presence of a basic catalyst, and the by-product, e.g., phenol, is removed from the system to allow the polymerization to proceed, thereby obtaining a polycarbonate resin.

However, the polycarbonate resins obtained using monomers having no phenolic hydroxyl group, such as those shown above, have poor thermal stability as compared with polycarbonate resins obtained using monomers having phenolic hydroxyl groups, e.g., bisphenol A, and hence have had the following problem. The polycarbonate resins take a color during the polymerization or molding in which the resins are exposed to high temperatures and, as a result, the polycarbonate resins come to absorb ultraviolet rays or visible light and hence have impaired light resistance. Especially when a cyclic dihydroxy compound having ether bonds in the molecule, such as isosorbide, was used, the polycarbonate resin considerably deteriorates in hue, making it more difficult to attain an improvement in lightness.

Furthermore, there has been the following problem. When such polycarbonate resins are to be used as various molded articles, the resins are melt-molded at high temperatures. However, coloring occurs in this molding also and, as a result, the polycarbonate resins come to absorb ultraviolet rays or visible light and hence have impaired light resistance.

Meanwhile, a technique is known in which a bluing agent is used for improving the hue of polycarbonate resins. However, there has been a problem that in the case where a polycarbonate resin into which a bluing agent is to be incorporated has a poor hue, this polycarbonate resin generally is deteriorated in lightness even though the hue is improved by incorporating the bluing agent.

Moreover, the polycarbonate resins obtained using bisphenol A as a starting material have had a problem that these resins have poor hydrolytic resistance and, under high-temperature high-humidity conditions, undesirably decrease in molecular weight and in properties accordingly.

An object of the invention is to eliminate the problems of prior-art techniques described above and to provide polycarbonate resin compositions which are excellent in terms of light resistance, transparency, hue, heat resistance, thermal stability, and mechanical strength.

Means for Solving the Problems

The present inventors diligently made investigations in order to overcome those problems. As a result, the inventors have found that a polycarbonate resin composition which includes a polycarbonate resin having in the molecule the structure represented by the following general formula (1) and further includes a bluing agent in a specific amount not only has excellent light resistance but also has excellent transparency, hue, heat resistance, thermal stability, and mechanical strength. The invention has been completed on the basis of this finding.

The inventors have further found that a polycarbonate resin composition which includes a polycarbonate resin (A) containing structural units derived from a dihydroxy compound represented by the following formula (2) as part of the structure thereof and further includes a bluing agent and which gives a molded object having a thickness of 2 mm that has a b* value of −1 to 1 and an L* value of 96.15 or larger not only has a sufficiently high lightness and, despite this, is inhibited from taking a color, but also simultaneously has excellent impact resistance, surface hardness, stability to high-temperature stagnation, and hydrolytic resistance. The invention has been completed on the basis of this finding.

Essential Points of the Invention are as Follows.

1. A polycarbonate resin composition which includes 100 parts by weight of a polycarbonate resin (A) at least containing structural units derived from a dihydroxy compound having the portion represented by the following formula (1) as part of the structure thereof and $0.1 \times 10^{-4}$ to $10.0 \times 10^{-4}$ parts by weight of a bluing agent, characterized in that a molded object (thickness, 3 mm) formed from the polycarbonate resin composition has a yellowness index (YI) value, as determined through an examination of transmitted light in accordance with ASTM D1925-70, of 12 or less after having undergone a 100-hour irradiation treatment with a metal halide lamp at an irradiance for the wavelength range 300-400 nm of 1.5 $kW/m^2$ in an environment having a temperature of 63° C. and a relative humidity of 50%.

[Chem. 1]

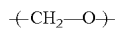

(1)

[The case where the portion represented by the general formula (1) constitutes —CH$_2$—O—H is excluded.]

2. The polycarbonate resin composition according to 1 above wherein the dihydroxy compound having the portion represented by the formula (1), from which structural units contained in the polycarbonate resin (A) are derived, is a dihydroxy compound represented by the following formula (2) and the content of the structural units derived from the dihydroxy compound represented by the formula (2) is 15% by mole or higher but less than 90% by mole based on all structural units in the polycarbonate resin (A) each derived from a dihydroxy compound.

[Chem. 2]

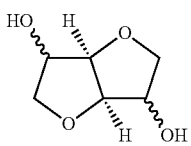

(2)

3. A polycarbonate resin composition which includes a polycarbonate resin (A) containing structural units derived from a dihydroxy compound represented by the following formula (2) as part of the structure thereof and further includes a bluing agent, wherein a molded object having a thickness of 2 mm formed from the polycarbonate resin composition has a b* value of −1 to 1 and an L* value of 96.15 or larger.

[Chem. 3]

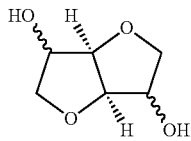

(2)

4. The polycarbonate resin composition according to any one of 1 to 3 above wherein the bluing agent is a dye which has an absorption maximum wavelength of 520-600 nm.

5. The polycarbonate resin composition according to any one of 1 to 4 above wherein the bluing agent is a compound represented by the following formula (3).

[Chem. 4]

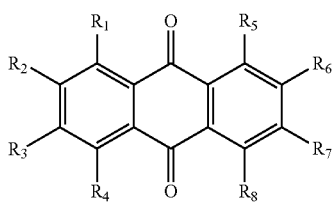

(3)

[In the formula (3), $R_1$ to $R_8$ each independently represent a hydrogen atom, a halogen atom, a hydroxyl group, an alkyl group having 1-3 carbon atoms, or an amino group which may have a substituent.]

6. The polycarbonate resin composition according to any one of 1 to 5 above which contains a hindered-amine stabilizer in an amount of 0.0001-1 part by weight per 100 parts by weight of the polycarbonate resin (A).

7. The polycarbonate resin composition according to any one of 1 to 6 above which contains an antioxidant in an amount of 0.0001-1 part by weight per 100 parts by weight of the polycarbonate resin (A).

8. A molded polycarbonate resin article obtained by molding the polycarbonate resin composition according to any one of 1 to 7 above.

Effects of the Invention

The polycarbonate resin compositions of the invention and molded articles thereof are excellent in terms of lightness, hue, and light resistance and are excellent also in terms of impact resistance, surface hardness, stability to high-temperature stagnation, and hydrolytic resistance. The polycarbonate resin compositions of the invention and the molded articles thereof are applicable to a wide range of fields including the field of injection molding for producing electrical and electronic parts, automotive parts, and the like, the field of films and sheets, the field of bottles and containers, lens applications such as camera lenses, finder lenses, and lenses for CCDs or CMOSs, films or sheets for use in liquid-crystal or plasma displays or the like, such as retardation films, diffusion sheets, and polarizing films, optical disks, optical materials, optical parts, and binder applications for fixing pigments, charge transfer agents, or the like.

The polycarbonate resin compositions of the invention and molded articles thereof are suitable for use in applications in which the compositions and the molded articles are exposed to light including ultraviolet rays, e.g., outdoor use or parts for illuminators, or in applications in which high lightness, reduced coloring, and a satisfactory hue are required, such as sunglasses, sports goggles, spectacle lenses, or containers for liquids.

MODES FOR CARRYING OUT THE INVENTION

Embodiments of the invention will be explained below in detail. The following explanations on constituent elements are for embodiments (representative embodiments) of the invention, and the invention should not be construed as being limited to the embodiments unless the invention departs from the spirit thereof. In the invention, "% by weight" has the same meaning as "% by mass".

1. Polycarbonate Resin Compositions

The invention provides the following polycarbonate resin composition (I) and polycarbonate resin composition (II) (hereinafter, each composition is often referred to as a polycarbonate resin composition of the invention).

1-1. Polycarbonate Resin Composition (I)

The polycarbonate resin composition (I) of the invention includes a polycarbonate resin at least containing structural units derived from a dihydroxy compound having the portion represented by the following formula (1) as part of the structure thereof, and is characterized in that a molded object (flat plate having a thickness of 3 mm) formed from the polycarbonate resin composition (I) has a yellowness index (YI) value, as determined through an examination of transmitted light in accordance with ASTM D1925-70 (1988), of 12 or less, preferably 10 or less, especially preferably 8 or less, after having undergone a 100-hour irradiation treatment with a metal halide lamp at an irradiance for the wavelength range 300-400 nm of 1.5 kW/m² in an environment having a temperature of 63° C. and a relative humidity of 50%.

The irradiation treatment with a metal halide lamp, in the invention, is an operation in which light regulated so as to have wavelengths of mainly 300-400 nm using specific filters or the like (light having the wavelengths outside the wavelength range has been removed as much as possible) is irradiated upon the sample for 100 hours at an irradiance of 1.5 kW/m² by means of a specific apparatus, as will be described later.

[Chem. 5]

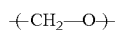  (1)

However, the case the portion represented by the general formula (1) is part of —CH₂—O—H is excluded.

When the yellowness index (YI) value, as determined in accordance with ASTM D1925-70 (1988) after the 100-hour irradiation treatment with a metal halide lamp at an irradiance for the wavelength range 300-400 nm of 1.5 kW/m², exceeds 12, there are cases where this molded object, even though colorless immediately after the molding of the polycarbonate resin composition (I), takes a color upon exposure to light containing ultraviolet light. It is surprising that this problem can be overcome by controlling the heat history which the resin undergoes in the transesterification reaction (polycondensation reaction) or by regulating the catalyst to be used, the metallic component(s) contained therein, the content of a substance having a specific molecular structure, etc.

When the polycarbonate resin composition (I) of the invention is molded into a flat plate having a thickness of 3 mm and this flat plate is examined for yellowness index through an examination of transmitted light without conducting the irradiation treatment with a metal halide lamp as described above or the like, then the yellowness index value thereof (initial yellowness index value; referred to as initial YI value) is usually preferably 10 or less, more preferably 7 or less, especially preferably 5 or less. The absolute value of the difference in yellowness index value between before and after the irradiation with a metal halide lamp is preferably 6 or less, more preferably 4 or less, especially preferably 3 or less. By regulating the initial yellowness index (YI) value thereof to 10 or less, light resistance can be improved.

The molded object (thickness, 3 mm) formed from the polycarbonate resin composition (I) of the invention has a light transmittance, as measured at a wavelength of 350 nm, of preferably 60% or higher, more preferably 65% or higher, especially preferably 70% or higher. By regulating the light transmittance thereof as measured at that wavelength to 60% or higher, absorption is reduced and light resistance can be improved.

The molded object (thickness, 3 mm) formed from the polycarbonate resin composition (I) of the invention has a light transmittance, as measured at a wavelength of 320 nm, of preferably 30% or higher, more preferably 40% or higher, especially preferably 50% or higher. By regulating the light transmittance thereof as measured at that wavelength to 30% or higher, light resistance can be improved.

Furthermore, when the polycarbonate resin composition (I) of the invention is molded into a flat plate having a thickness of 3 mm and this flat plate is examined for the L* value through an examination of transmitted light as provided for by the International Commission on Illumination (CIE), then the L* value thereof is usually preferably 94.3 or larger, more preferably 94.6 or larger, even more preferably 94.8 or larger. By regulating the L* value thereof to 94.3 or larger, light resistance can be improved.

1-2. Polycarbonate Resin Composition (II)

This composition (II) is a polycarbonate resin composition which includes a polycarbonate resin (A) containing structural units derived from a dihydroxy compound represented by the following formula (2) as part of the structure thereof and further includes a bluing agent, and is characterized in that a molded object having a thickness of 2 mm formed from the polycarbonate resin composition has a b* value of −1 to 1 and an L* value of 96.15 or larger.

[Chem. 6]

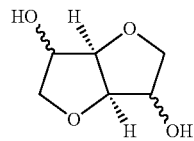  (2)

This polycarbonate resin composition of the invention is excellent in terms of light resistance, transparency, hue, heat resistance, thermal stability, and mechanical strength. In particular, since the polycarbonate resin composition (II) of the invention includes the polycarbonate resin (A), which will be described later, and a given amount of a bluing agent, this composition preferably satisfies the specific b* value and/or the specific L* value. Consequently, this composition has a higher lightness or a lower degree of coloration or can simultaneously satisfy both. This composition can have a feature that molded articles obtained therefrom have a more attractive appearance. In particular, when the molded articles are used as beverage containers or the like, the articles, in the state of containing the contents, have enhanced attractiveness.

Namely, in the polycarbonate resin composition (II) of the invention, the content of the bluing agent is regulated so that the b* value thereof according to the invention is −1 to 1, preferably −0.7 to 0.7, more preferably −0.5 to 0.5. The L* value thereof is 96.15 or larger, preferably 96.20 or larger, more preferably 96.30 or larger.

The b* value and the L* value are two of the three coordinates [CIE L*a*b* (CIELAB)] which were introduced by the International Commission on Illumination (CIE) in order to express all colors seen by the human vision.

The three coordinates of the CIELAB are L*, a*, and b*. Of these coordinates, L* indicates the lightness of color; L*=0 indicates black and L*=100 indicates white. Consequently, the values of L* range from 0 to 100. Meanwhile, a* indicates the location of color between red/magenta and green; a negative value of a* indicates a location which is on the green side, whereas a positive value thereof indicates a location which is on the magenta side. Furthermore, b* indicates the location of color between yellow and blue; a negative value of b* indicates a location which is on the blue side, whereas a positive value thereof indicates a location which is on the yellow side. The polycarbonate resin composition of the invention has values of L* and b*, among these CIELAB coordinates, that are within the specific ranges.

Incidentally, the values of b* and L* in the polycarbonate resin composition of the invention are values measured through an examination of a 2 mm-thick molded article formed from the polycarbonate resin composition of the invention, specifically by the method which will be described later in the section Examples.

The polycarbonate resin composition (I) or (II) described above produces the effects of the invention. This polycarbonate resin composition can be produced, for example, by suitably selecting the kind and amount of a catalyst, suitably selecting a polymerization temperature and a polymerization time, reducing the content in the resin of any compound which has the ability to absorb ultraviolet rays, e.g., residual phenol or residual diphenyl carbonate, reducing the use amount of a starting-material monomer which is a substance that shows absorption in the ultraviolet region, and reducing the use amount of a substance which is contained as an impurity in a starting material and shows absorption in the ultraviolet region. Especially important are the kind and amount of a catalyst, a polymerization temperature, and a polymerization time.

2. Polycarbonate Resin (A)

A process for producing the polycarbonate resin (A) according to the invention is described below. The polycarbonate resin (A) according to the invention may be obtained by subjecting one or more dihydroxy compounds including the dihydroxy compound according to the invention, which is described below, to polycondensation with a carbonic diester by means of a transesterification reaction.

<Starting Materials>

(Dihydroxy Compounds)

The polycarbonate resin (A) according to the invention at least contains structural units derived from a dihydroxy compound having the portion represented by the following general formula (1) as part of the structure thereof (hereinafter often referred to as "dihydroxy compound according to the invention"). Namely, the term "dihydroxy compound according to the invention" means a dihydroxy compound that at least contains two hydroxyl groups and the structural unit of the following general formula (1).

[Chem. 7]

(1)

However, the case where the portion represented by the general formula (1) is part of —CH$_2$—O—H is excluded.

The dihydroxy compound according to the invention is not particularly limited so long as the compound is a dihydroxy compound which has the portion represented by the general formula (1) as part of the structure thereof. Examples thereof include oxyalkylene glycols such as diethylene glycol, triethylene glycol, and tetraethylene glycol, compounds which have an aromatic group as a side chain and have, in the main chain, ether groups each bonded to an aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene, anhydrous sugar alcohols represented by dihydroxy compounds represented by the following general formula (2), and compounds having a cyclic ether structure, such as the spiro glycol or compound represented by the following formula (4) or formula (5). These compounds may be used alone or may be used in combination of two or more thereof, according to the performances required of the polycarbonate resin to be obtained.

From the standpoint of heat resistance, the anhydrous sugar alcohols and compounds having a cyclic ether structure are preferred of these. Diethylene glycol and triethylene glycol are preferred from the standpoints of availability, handling, reactivity during polymerization, and the hue of the polycarbonate resin to be obtained.

[Chem. 8]

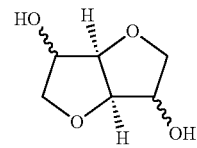

(2)

[Chem. 9]

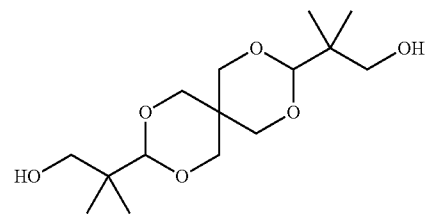

(4)

[Chem. 10]

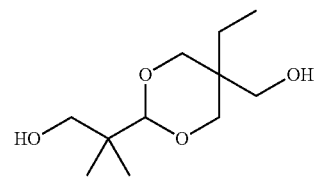

(5)

Examples of the dihydroxy compounds represented by the general formula (2) include isosorbide, isomannide, and isoidide, which are stereoisomers. These compounds may be used alone or in combination of two or more thereof. Since these dihydroxy compounds have no phenolic hydroxyl group, it is usually difficult to polymerize the compounds by the interfacial method. It is usually preferred that the polycarbonate resin (A) according to the invention should be produced through a transesterification reaction in which a carbonic diester is used.

The dihydroxy compound of an alicyclic hydrocarbon is a compound which has a hydrocarbon framework of a cyclic structure and two hydroxy groups. The hydroxy groups each may be have been directly bonded to the cyclic structure or may have been bonded to the cyclic structure through a substituent. In each of the dihydroxy compound of an alicyclic hydrocarbon and the dihydroxy compounds having a cyclic ether structure in the molecule, the cyclic structure may be monocyclic or polycyclic. However, the dihydroxy compounds having a cyclic ether structure in the molecule preferably are dihydroxy compounds each having a plurality of cyclic structures, and more preferably are dihydroxy compounds each having two cyclic structures. In particular, it is preferred that these two cyclic structures should be the same.

From the standpoint of the light resistance of the polycarbonate resin, it is preferred that dihydroxy compounds having no aromatic ring structure should be used among those dihydroxy compounds. Most preferred of those dihydroxy compounds is isosorbide from the standpoints of availability, ease of production, light resistance, optical properties, moldability, heat resistance, and carbon neutrality. Isosorbide is obtained by the dehydrating condensation of sorbitol, which is produced from various starches that are plant-derived abundant resources and are easily available.

The structure derived from a dihydroxy compound represented by the formula (2) is rigid. Because of this, when a dihydroxy compound represented by the formula (2) is used in too large an amount, the resultant polymer also tends to be hard and brittle and tends to have reduced moldability or mechanical properties. When the amount thereof is too small, there are cases where the resultant polymer has poor heat resistance and is difficult to use as a molding material. It is hence possible to obtain effects, such as an improvement in the flexibility of the polycarbonate resin or an improvement in the moldability thereof, by using other dihydroxy compounds. However, in case where the content of structural units derived from other dihydroxy compounds is too high, this may result in a decrease in mechanical property or a decrease in heat resistance.

Consequently, it is preferred that the structures derived from a dihydroxy compound having the portion represented by the general formula (1) as part of the structure thereof should be contained in the polycarbonate resin (A) in an amount which is preferably 5% by mole or more, more preferably 10% by mole or more, even more preferably 15% by mole or more, especially preferably 20% by mole or more, and is preferably 90% by mole or less, more preferably 80% by mole or less, especially preferably 70% by mole or less, based on all structural units each derived from a dihydroxy compound.

The polycarbonate resin according to the invention may contain structural units derived from dihydroxy compounds other than the dihydroxy compound according to the invention (hereinafter, those dihydroxy compounds are often referred to as "other dihydroxy compounds"). Examples of the other dihydroxy compounds include aliphatic dihydroxy compounds such as ethylene glycol, 1,3-propanediol, 1,2-propanediol, 1,4-butanediol, 1,3-butanediol, 1,2-butanediol, 1,5-heptanediol, and 1,6-hexanediol and alicyclic dihydroxy compounds such as 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol, and 1,3-adamantanedimethanol.

The dihydroxy compounds of alicyclic hydrocarbons each are a compound which has a hydrocarbon framework of a cyclic structure and two hydroxy groups and in which the hydroxy groups each may have been directly bonded to the cyclic structure or may have been bonded to the cyclic structure through a substituent. In each of the dihydroxy compounds of alicyclic hydrocarbons and the dihydroxy compounds having a cyclic ether structure in the molecule, the cyclic structure may be monocyclic or polycyclic. However, the dihydroxy compounds having a cyclic ether structure in the molecule preferably are dihydroxy compounds each having a plurality of cyclic structures, and more preferably are dihydroxy compounds each having two cyclic structures. In particular, it is preferred that these two cyclic structures should be the same.

Examples of the other dihydroxy compounds further include aromatic bisphenol compounds such as 2,2-bis(4-hydroxyphenyl)propane[=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl) propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl) cyclohexane, bis(4-hydroxyphenyl) sulfone, 2,4'-dihydroxydiphenyl sulfone, bis(4-hydroxyphenyl) sulfide, 4,4'-dihydroxydiphenyl ether, 4,4'-dihydroxy-3,3'-dichlorodiphenyl ether, 9,9-bis(4-(2-hydroxyethoxy-2-methyl) phenyl)fluorene, 9,9-bis(4-hydroxyphenyl)fluorene, and 9,9-bis(4-hydroxy-2-methylphenyl)fluorene.

From the standpoint of the light resistance of the polycarbonate resin, it is preferred to use, among those compounds, at least one compound selected from the group consisting of the dihydroxy compounds having no aromatic ring structure in the molecular structure, i.e., the aliphatic dihydroxy compounds and the alicyclic dihydroxy compounds. Especially preferred aliphatic dihydroxy compounds are 1,3-propanediol, 1,4-butanediol, and 1,6-hexanediol. Especially preferred alicyclic dihydroxy compounds are 1,4-cyclohexanedimethanol and tricyclodecanedimethanol.

Use of such other dihydroxy compounds makes it possible to obtain effects such as an improvement in the flexibility of the polycarbonate resin, an improvement in the heat resistance thereof, and an improvement in the moldability thereof. However, in case where the content of structural units derived from other dihydroxy compounds is too high, this may result in a decrease in mechanical property or a decrease in heat resistance. Consequently, the proportion of structural units derived from the dihydroxy compound according to the invention, based on all structural units each derived from a dihydroxy compound, is preferably 20% by mole or higher, more preferably 30% by mole or higher, especially preferably 50% by mole or higher.

The dihydroxy compound according to the invention may contain a stabilizer such as a reducing agent, antioxidant, deoxidizer, light stabilizer, antacid, pH stabilizer, or heat stabilizer. Since the dihydroxy compound according to the invention is apt to alter especially under acidic conditions, it is preferred that the dihydroxy compound should contain a basic stabilizer.

Examples of the basic stabilizer include the hydroxides, carbonates, phosphates, phosphites, hypophosphites, borates, or fatty acid salts of Group-1 or Group-2 metals of the long-form periodic table (Nomenclature of Inorganic Chemistry IUPAC Recommendations 2005). Examples thereof further include basic ammonium compounds such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide and amine compounds such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline. Of these, the phosphates and phosphites of sodium or potassium are preferred from the standpoints of the effect thereof and the ease of removal thereof by distillation which will be described later. Especially preferred are disodium hydrogen phosphate and disodium hydrogen phosphite.

There are no particular limitations on the content of those basic stabilizers in the dihydroxy compound according to the invention. However, in case where the content thereof is too low, there is a possibility that the effect of preventing the alteration of the dihydroxy compound according to the invention might not be obtained. When the content thereof is too high, there are cases where the dihydroxy compound according to the invention is altered. Consequently, the content of those basic stabilizers is usually preferably 0.0001-1% by weight, more preferably 0.001-0.1% by weight, based on the dihydroxy compound according to the invention.

When the dihydroxy compound according to the invention which contains those basic stabilizers is used as a starting material for producing a polycarbonate resin, not only the basic stabilizers themselves serve as a polymerization catalyst to make it difficult to control polymerization rate and quality, but also the presence of the basic stabilizers leads to a deterioration in initial hue, resulting in molded articles having impaired light resistance. It is therefore preferred that the basic stabilizers should be removed with an ion-exchange resin or by distillation or the like before the dihydroxy compound is used as a starting material for producing a polycarbonate resin.

In the case where the dihydroxy compound according to the invention is a compound having a cyclic ether structure, e.g., isosorbide, this dihydroxy compound is apt to be gradually oxidized by oxygen. It is therefore preferred to prevent water inclusion during storage or production in order to prevent decomposition caused by oxygen. It is also preferred to use a deoxidizer or the like or to handle the dihydroxy compound in a nitrogen atmosphere. There are cases where isosorbide, upon oxidation, generates decomposition products including formic acid. For example, in case where isosorbide containing those decomposition products is used as a starting material for producing a polycarbonate resin, there is the possibility of resulting in a colored polycarbonate resin. There also is a possibility that the decomposition products considerably deteriorate the properties of the resin. In addition, there are cases where the decomposition products affect the polymerization reaction to make it impossible to obtain a polymer having a high molecular weight. Use of such isosorbide hence is undesirable.

It is preferred to conduct purification by distillation in order to obtain the dihydroxy compound according to the invention which does not contain the oxidative-decomposition products and to remove the basic stabilizers described above. The distillation in this case may be simple distillation or continuous distillation, and is not particularly limited. With respect to distillation conditions, it is preferred to conduct distillation at a reduced pressure in an inert gas atmosphere such as argon or nitrogen. From the standpoint of inhibiting thermal alteration, it is preferred to conduct the distillation under the conditions of preferably 250° C. or lower, more preferably 200° C. or lower, especially preferably 180° C. or lower.

Through such purification by distillation, the content of formic acid in the dihydroxy compound according to the invention is reduced to preferably 20 weight ppm or less, more preferably 10 weight ppm or less, especially preferably 5 weight ppm or less. As a result, when dihydroxy compounds including this dihydroxy compound according to the invention are used as a starting material for producing a polycarbonate resin, polymerizability is not impaired and a polycarbonate resin having an excellent hue or excellent thermal stability can be produced. The content of formic acid is determined by ion chromatography.

(Carbonic Diester)

The polycarbonate resin (A) according to the invention can be obtained using one or more dihydroxy compounds including the dihydroxy compound according to the invention described above and a carbonic diester as starting materials, by condensation-polymerizing the starting materials by means of a transesterification reaction.

Examples of the carbonic diester to be used usually include compounds represented by the following general formula (6). One of these carbonic diesters may be used alone, or a mixture of two or more thereof may be used.

[Chem. 11]

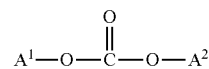

(6)

In the general formula (6), $A^1$ and $A^2$ each independently are a substituted or unsubstituted aliphatic group having 1-18 carbon atoms or a substituted or unsubstituted aromatic group.

Examples of the carbonic diesters represented by the general formula (6) include diphenyl carbonate, substituted diphenyl carbonates, e.g., ditolyl carbonate, dimethyl carbonate, diethyl carbonate, and di-t-butyl carbonate.

Preferred of these are diphenyl carbonate and substituted diphenyl carbonates. Especially preferred is diphenyl carbonate. Incidentally, there are cases where carbonic diesters contain impurities such as chloride ions and where the impurities inhibit the polymerization reaction and impair the hue of the polycarbonate resin to be obtained. It is therefore preferred that a carbonic diester which has been purified by, for example, distillation should be used according to need.

<Transesterification Reaction Catalyst>

The polycarbonate resin (A) according to the invention may be produced by subjecting one or more dihydroxy compounds including the dihydroxy compound according to the invention and a carbonic diester to a transesterification reaction, as stated above. More specifically, the polycarbonate resin is obtained by subjecting the starting materials to transesterification and removing the by-product monohydroxy compound, etc. from the system. In this case, polycondensation is usually conducted by means of a transesterification reaction in the presence of a transesterification reaction catalyst.

The transesterification reaction catalyst (hereinafter often referred to simply as catalyst or polymerization catalyst) which can be used for producing the polycarbonate resin (A) according to the invention can affect light transmittance as measured especially at a wavelength of 350 nm or yellowness index value.

The catalyst to be used is not limited so long as the catalyst can satisfy light resistance, i.e., can make the polycarbonate resin have a specific value of the light transmittance as measured at a wavelength of 350 nm or of the yellowness index. Examples thereof include compounds of metals belonging to Group 1 or Group 2 of the long-form periodic table (hereinafter referred to simply as "Group 1" or "Group 2") and basic compounds such as basic boron compounds, basic phosphorus compounds, basic ammonium compounds, and amine compounds. It is preferred to use a Group-1 metal compound and/or a Group-2 metal compound among these.

It is possible to use a basic compound such as a basic boron compound, basic phosphorus compound, basic ammonium compound, or amine compound as an auxiliary together with a Group-1 metal compound and/or a Group-2 metal compound. It is, however, especially preferred to use a Group-1 metal compound and/or a Group-2 metal compound only.

With respect to the form of the Group-1 metal compound and/or Group-2 metal compound, the compound is used usually in the form of a hydroxide or a salt such as carbonate, carboxylate, or phenolate. However, hydroxides, carbonates, and acetates are preferred from the standpoints of availability and handleability, and acetates are preferred from the standpoints of hue and activity in polymerization.

Examples of the Group-1 metal compound include sodium compounds such as sodium hydroxide, sodium hydrogen carbonate, sodium carbonate, sodium acetate, sodium stearate, sodium boron hydride, phenylated sodium-boron compounds, sodium benzoate, disodium hydrogen phosphate, disodium phenyl phosphate, alcoholates or phenolates of sodium, and the disodium salt of bisphenol A, potassium compounds such as potassium hydroxide, potassium hydrogen carbonate, potassium carbonate, potassium acetate, potassium stearate, potassium boron hydride, phenylated potassium-boron compounds, potassium benzoate, dipotassium hydrogen phosphate, dipotassium phenyl phosphate, alcoholates or phenolates of potassium, and the dipotassium salt of bisphenol A, lithium compounds such as lithium hydroxide, lithium hydrogen carbonate, lithium carbonate, lithium acetate, lithium stearate, lithium boron hydride, phenylated lithium-boron compounds, lithium benzoate, dilithium hydrogen phosphate, dilithium phenyl phosphate, alcoholates or phenolates of lithium, and the dilithium salt of bisphenol A, and cesium compounds such as cesium hydroxide, cesium hydrogen carbonate, cesium carbonate, cesium acetate, cesium stearate, cesium boron hydride, phenylated cesium-boron compounds, cesium benzoate, dicesium hydrogen phosphate, dicesium phenyl phosphate, alcoholates or phenolates of cesium, and the dicesium salt of bisphenol A. Preferred of these are the lithium compounds.

Examples of the Group-2 metal compound include calcium compounds such as calcium hydroxide, calcium hydrogen carbonate, calcium carbonate, calcium acetate, and calcium stearate, barium compounds such as barium hydroxide, barium hydrogen carbonate, barium carbonate, barium acetate, and barium stearate, magnesium compounds such as magnesium hydroxide, magnesium hydrogen carbonate, magnesium carbonate, magnesium acetate, and magnesium stearate, and strontium compounds such as strontium hydroxide, strontium hydrogen carbonate, strontium carbonate, strontium acetate, and strontium stearate. Preferred of these are the magnesium compounds, the calcium compounds, and the barium compounds. From the standpoints of activity in polymerization and the hue of the polycarbonate resin to be obtained, at least one metal compound selected from the group consisting of the magnesium compounds and the calcium compounds is more preferred, and the calcium compounds are most preferred.

Examples of the basic boron compound include the sodium salts, potassium salts, lithium salts, calcium salts, barium salts, magnesium salts, and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compound include triethylphosphine, tri-n-propylphosphine, triisopropylphosphine, tri-n-butylphosphine, triphenylphosphine, tributylphosphine, and quaternary phosphonium salts.

Examples of the basic ammonium compound include tetramethylammonium hydroxide, tetraethylammonium hydroxide, tetrapropylammonium hydroxide, tetrabutyl ammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

The amount of the polymerization catalyst to be used is usually preferably 0.1-300 µmol, more preferably 0.5-100 µmol, per mole of all dihydroxy compounds used. Especially in the case where use is made of one or more compounds of at least one metal selected from the group consisting of lithium and the Group-2 metals of the long-form periodic table, in particular, in the case where at least one metal compound selected from the group consisting of magnesium compounds and calcium compounds is used, the amount of this catalyst is usually preferably 0.1 µmol or more, more preferably 0.5 µmol or more, especially preferably 0.7 µmol or more, in terms of metal amount per mole of all dihydroxy compounds used. The upper limit thereof is usually preferably 20 µmol, more preferably 10 µmol, even more preferably 3 µmol, especially preferably 1.5 µmol, in particular 1.0 µmol.

In case where the amount of the polymerization catalyst used is too small, the rate of polymerization is too low. As a result, a higher polymerization temperature must be used in order to obtain a polycarbonate resin having a desired molecular weight, and the polycarbonate resin thus obtained has an impaired hue or impaired light resistance. In addition, there is a possibility that an unreacted starting material might volatilize during the polymerization to change the molar proportions of the dihydroxy compounds including the dihydroxy compound according to the invention and of the carbonic diester and a desired molecular weight might not be reached. On the other hand, in case where the polymerization catalyst is used in too large an amount, there is a possibility that the resultant polycarbonate resin might have an impaired hue and impaired light resistance.

There is a possibility that when Group-1 metals, especially sodium, potassium, and cesium, in particular, lithium, sodium, potassium, and cesium, are contained in the polycarbonate resin in a large amount, these metals might adversely affect the hue. These metals do not come only from the catalyst used but may come from starting materials or the reactor. Consequently, the total amount of compounds of those metals in the polycarbonate resin is usually preferably 1 weight ppm or less, more preferably 0.8 weight ppm or less, even more preferably 0.7 weight ppm or less, in terms of metal amount.

The content of metals in the polycarbonate resin can be determined by recovering the metals contained in the polycarbonate resin by a technique such as wet ashing and then determining the amount of the metals using a technique such as atomic emission, atomic absorption, or inductively coupled plasma (ICP) spectroscopy.

<Process for Producing Polycarbonate Resin (A)>

Although the polycarbonate resin (A) according to the invention is obtained by condensation-polymerizing one or more dihydroxy compounds including the dihydroxy compound according to the invention with a carbonic diester by means of a transesterification reaction, it is preferred to evenly mix the starting materials, i.e., the dihydroxy compounds and the carbonic diester, prior to the transesterification reaction.

The temperature at which the starting materials are mixed together is usually preferably 80° C. or higher, more preferably 90° C. or higher, and the upper limit thereof is usually preferably 250° C. or lower, more preferably 200° C. or lower, even more preferably 150° C. or lower. Especially suitable is a temperature of 100-120° C. In case where the mixing temperature is too low, there is a possibility that the starting materials might have too low a dissolution rate or an insufficient solubility, often resulting in troubles such as solidification. When the mixing temperature is too high, there are cases where the dihydroxy compounds deteriorate thermally and, as a result, the polycarbonate resin (A) obtained has an impaired hue, which may adversely affect light resistance.

It is preferred from the standpoint of preventing hue deterioration that an operation for mixing the dihydroxy compounds including the dihydroxy compound according to the invention and the carbonic diester, which are starting materials for the polycarbonate resin (A) according to the invention, should be conducted in an atmosphere having an oxygen concentration of preferably 10% by volume or less, more preferably 0.0001-10% by volume, even more preferably 0.0001-5% by volume, especially preferably 0.0001-1% by volume.

It is preferred that for obtaining the resin according to the invention, the carbonic diester should be used in such an amount that the molar proportion thereof to all dihydroxy compounds to be subjected to the reaction, which include the dihydroxy compound according to the invention, is preferably 0.90-1.20. The molar proportion thereof is more preferably 0.95-1.10, even more preferably 0.98-1.02, especially preferably 0.99-1.01.

In case where the molar proportion thereof is too low, the polycarbonate resin (A) produced has an increased amount of terminal hydroxyl groups. This polymer has impaired thermal stability and may take a color upon molding. There also is a possibility that this transesterification reaction might proceed at a reduced rate or be unable to yield a desired high-molecular polymer.

When the molar proportion thereof is too high, there are cases where the transesterification reaction proceeds at a reduced rate or it is difficult to produce a polycarbonate having a desired molecular weight. The decrease in the rate of transesterification reaction enhances heat history during the polymerization reaction, resulting in a possibility that the enhanced heat history might impair the hue or light resistance of the polycarbonate resin (A) obtained.

Furthermore, when the molar proportion of the carbonic diester to all dihydroxy compounds including the dihydroxy compound according to the invention is too high, there are cases where the polycarbonate resin (A) obtained has an increased content of the residual carbonic diester and the residual carbonic diester absorbs ultraviolet rays to impair the light resistance of the polycarbonate resin (A). Such too high proportions of the carbonic diester are hence undesirable.

The concentration of the carbonic diester represented by the general formula (6) remaining in the polycarbonate resin (A) according to the invention is preferably 200 weight ppm or less, more preferably 100 weight ppm or less, even more preferably 60 weight ppm or less, especially preferably 30 weight ppm or less. Actually, the polycarbonate resin (A) may contain unreacted carbonic diesters. A lower limit of the concentration thereof is preferably 1 weight ppm.

In the invention, a process in which the dihydroxy compounds are condensation-polymerized with the carbonic diester is conducted in the presence of the catalyst described above usually in multiple stages using a plurality of reactors. The mode of reaction operation may be any of the batch type, the continuous type, and a combination of the batch type and the continuous type.

It is preferred that in the initial stage of the polymerization, the polymerization should be conducted at a relatively low temperature and under relatively low vacuum to obtain a prepolymer, and that in the late stage of the polymerization, the polymerization should be conducted at a relatively high temperature under relatively high vacuum to heighten the molecular weight to a given value. It is, however, important from the standpoint of hue or light resistance that a jacket temperature, an internal temperature, and an internal pressure of the reaction system should be suitably selected for each molecular-weight stage.

For example, in case where either temperature or pressure is rapidly changed before the polymerization reaction reaches a given value, an unreacted monomer is distilled off to change the molar ratio of the dihydroxy compounds to the carbonic diester. This may result in a decrease in polymerization rate or make it impossible to obtain a polymer having a given molecular weight or having given end groups. There is hence a possibility that the objects of the invention cannot finally be accomplished.

To provide a polymerizer with a reflux condenser is effective for inhibiting the monomers from being distilled off. This effect is high especially in the reactor for the initial stage of polymerization, in which the amount of unreacted monomer ingredients is large. The temperature of the coolant which is being introduced into the reflux condenser can be suitably selected according to the monomers used.

Usually, the temperature of the coolant being introduced into the reflux condenser, as measured at the inlet of the reflux condenser, is preferably 45-180° C., more preferably 80-150° C., especially preferably 100-150° C. In case where the temperature of the coolant is too high, the amount of the monomers being refluxed decreases, resulting in a decrease in the effect of the refluxing. Conversely, in case where the temperature thereof is too low, the efficiency of the removal by distillation of the monohydroxy compound to be removed by distillation tends to decrease. Examples of the coolant include hot water, steam, and a heat-medium oil. Preferred is steam or a heat-medium oil.

The selection of the kind and amount of a catalyst described above is important for maintaining a suitable polymerization rate and inhibiting the monomers from being distilled off and for simultaneously enabling the finally obtained polycarbonate resin (A) to have intact properties such as hue, thermal stability, or light resistance.

It is preferred that the polycarbonate resin (A) according to the invention should be produced by polymerizing the starting materials in multiple stages using a catalyst and a plurality of reactors. The reasons why the polymerization is conducted in a plurality of reactors are that in the initial stage of the polymerization reaction, since the monomers are contained in a large amount in the liquid reaction mixture, it is important that the monomers should be inhibited from volatilizing off while maintaining a necessary polymerization rate, and that in the late stage of the polymerization reaction, it is important to sufficiently remove by distillation the by-product monohydroxy compound in order to shift the equilibrium to the polymerization side. For thus setting different sets of polymerization reaction conditions, it is preferred to use a plurality of polymerizers arranged serially, from the standpoint of production efficiency.

The number of reactors to be used in the process according to the invention is not limited so long as the number thereof is at least 2 as described above. From the standpoints of production efficiency, etc., the number thereof is preferably 3 or more, more preferably 3-5, especially preferably 4.

In the invention, the process may be conducted in various manners so long as two or more reactors are used. For example, a plurality of reaction stages differing in conditions are formed in any of the reactors, or the temperature and the pressure may be continuously changed in any of the reactors.

In the invention, the polymerization catalyst can be introduced into a starting-material preparation tank or a starting-material storage tank, or can be introduced directly into a polymerization vessel. However, from the standpoints of stability of feeding and polymerization control, a catalyst supply line is disposed somewhere in a starting-material line before a polymerization vessel, and the catalyst is supplied preferably in the form of an aqueous solution.

With respect to polymerization reaction temperature, too low temperatures result in a decrease in productivity or cause the product to undergo an enhanced heat history. Too high temperatures not only result in monomer volatilization but also result in the possibility of enhancing degradation or coloring of the polycarbonate resin.

Specifically, the reaction in the first stage may be conducted at a temperature of preferably 140-270° C., more preferably 180-240° C., even more preferably 200-230° C., in terms of the maximum internal temperature of the polymerizer, and a pressure of preferably 110-1 kPa, more preferably 70-5 kPa, even more preferably 30-10 kPa (absolute pressure), for preferably 0.1-10 hours, more preferably 0.5-3 hours, while the monohydroxy compound which generates is being removed from the reaction system by distillation.

In the second and any succeeding stages, the pressure of the reaction system is gradually lowered from the pressure used in the first stage, and the polymerization is conducted while the monohydroxy compound which generates is being continuously removed from the reaction system. Finally, the pressure (absolute pressure) of the reaction system is lowered to 200 Pa or below. The second and any succeeding stages are thus conducted at a maximum internal temperature of preferably 210-270° C., more preferably 220-250° C., for a period of usually preferably 0.1-10 hours, more preferably 1-6 hours, especially preferably 0.5-3 hours.

Especially from the standpoints of inhibiting the polycarbonate resin from taking a color or deteriorating thermally and of thereby obtaining the polycarbonate resin having a satisfactory hue or satisfactory light resistance, it is preferred that the maximum internal temperature in all reaction stages should be lower than 250° C., in particular 225-245° C. From the standpoints of inhibiting the rate of polymerization from decreasing in the latter half of the polymerization reaction and of thereby minimizing the deterioration caused by heat history, it is preferred to use, in the final stage of the polymerization, a horizontal reactor having excellent plug flow characteristics and interface renewal characteristics.

In case where the polymerization is conducted at too high a temperature or for too long a period in order to obtain a polycarbonate resin (A) having a given molecular weight, there is a tendency that the resultant polycarbonate resin has a reduced ultraviolet transmittance and an increased YI value.

From the standpoint of effective utilization of resources, it is preferred that the monohydroxy compound which generated as a by-product should be reused as a starting material for diphenyl carbonate, bisphenol A, or the like after being purified according to need.

The polycarbonate resin (A) according to the invention, after having been obtained through polycondensation as described above, is usually solidified by cooling and pelletized with a rotary cutter or the like.

Methods for the pelletization are not limited. Examples thereof include: a method in which the polycarbonate resin is discharged in a molten state from the final polymerizer, cooled and solidified in a strand form, and pelletized; a method in which the resin is fed in a molten state from the final polymerizer to a single- or twin-screw extruder, melt-extruded, subsequently cooled and solidified, and pelletized; and a method which includes discharging the resin in a molten state from the final polymerizer, cooling and solidifying the resin in a strand form, temporarily pelletizing the resin, thereafter feeding the resin to a single- or twin-screw extruder again, melt-extruding the resin, and then cooling, solidifying, and pelletizing the resin.

During such operations, residual monomers can be removed by volatilization under vacuum within the extruder. It is also possible to add a generally known additive such as a heat stabilizer, neutralizing agent, ultraviolet absorber, release agent, colorant, antistatic agent, slip agent, lubricant, plasticizer, compatibilizing agent, or flame retardant and knead the mixture within the extruder.

The temperature to be used for melt kneading in the extruder depends on the glass transition temperature or molecular weight of the polycarbonate resin. However, the melt kneading temperature is usually preferably 150-300° C., more preferably 200-270° C., even more preferably 230-260° C. By regulating the melt kneading temperature to 150° C. or higher, the polycarbonate resin is made to have a reduced melt viscosity and to impose a reduced load on the extruder, resulting in an improvement in productivity. By regulating the melt kneading temperature to 300° C. or lower, the polycarbonate is inhibited from deteriorating thermally. As a result, it is possible to prevent a decrease in mechanical strength due to a decrease in molecular weight or to prevent coloring or gas evolution.

When the polycarbonate resin (A) according to the invention is produced, it is preferred to dispose a filter in order to prevent inclusion of foreign matter. The position where a filter is disposed preferably is on the downstream side of the extruder. The rejection size (opening size) of the filter is preferably 100 µm or smaller in terms of 99% removal filtration accuracy. Especially when the resin is for use in film applications or the like for which inclusion of minute foreign particles should be avoided, the opening size of the filter is preferably 40 µm or smaller, more preferably 10 µm or smaller.

From the standpoint of preventing inclusion of foreign matter from occurring after extrusion, it is preferred that the polycarbonate resin (A) according to the invention should be extruded in a clean room having a cleanliness preferably higher than class 7 defined in JIS B 9920 (2002), more preferably higher than class 6.

Furthermore, for cooling and pelletizing the extruded polycarbonate resin (A), it is preferred to use a cooling method such as air cooling or water cooling. It is preferred that air from which airborne foreign matter has been removed beforehand with a high-efficiency particulate air filter or the like should be used for the air cooling to prevent airborne foreign matter from adhering again. In the case of conducting water cooling, it is preferred to use water from which metallic substances have been removed with an ion-exchange resin or the like and from which foreign matter has been removed with a filter. It is preferred that the filter to be used should have an opening size of 10-0.45 µm in terms of 99% removal filtration accuracy.

<Properties of Polycarbonate Resin (A)>

The molecular weight of the polycarbonate resin (A) according to the invention can be expressed in terms of reduced viscosity. The reduced viscosity thereof is usually preferably 0.30 dL/g or higher, more preferably 0.35 dL/g or higher. The upper limit of the reduced viscosity thereof is preferably 1.20 dL/g or less, more preferably 1.00 dL/g or less, even more preferably 0.80 dL/g or less.

In case where the reduced viscosity of the polycarbonate resin is too low, there is a possibility that this polycarbonate resin might give molded articles having low mechanical strength. In case where the reduced viscosity thereof is too high, this polycarbonate resin has reduced flowability during molding and this tends to reduce productivity or moldability.

Incidentally, the reduced viscosity of a polycarbonate is determined by preparing a solution thereof having a polycarbonate concentration precisely adjusted to 0.6 g/dL using methylene chloride as a solvent and measuring the viscosity of the solution with an Ubbelohde viscometer at a temperature of 20.0±0.1° C.

In the polycarbonate resin (A) according to the invention, the lower limit of the concentration of the end group represented by the following general formula (7) (referred to as "concentration of terminal phenyl groups") is usually preferably 20 µeq/g, more preferably 40 µeq/g, especially preferably 50 µeq/g. The upper limit thereof is usually preferably 160 µeq/g, more preferably 140 µeq/g, especially preferably 100 µeq/g.

In case where the concentration of the end group represented by the following general formula (7) is too high, there is a possibility that even when the polycarbonate resin has a satisfactory hue immediately after polymerization or during molding, the high end group concentration might result in a hue deterioration through exposure to ultraviolet rays. Conversely, in case where the concentration thereof is too low, there is a possibility that this polycarbonate resin might have reduced thermal stability.

Examples of methods for regulating the concentration of the end group represented by the following general formula (7) include: to regulate the molar proportions of the starting materials, i.e., one or more dihydroxy compounds including the dihydroxy compound according to the invention and a carbonic diester; and to control a factor in the transesterification reaction, such as the kind and amount of a catalyst, polymerization pressure, or polymerization temperature.

[Chem. 12]

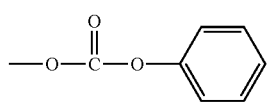

(7)

In the case where diphenyl carbonate or a substituted diphenyl carbonate, e.g., ditolyl carbonate, is used as a carbonic diester represented by the general formula (6) to produce a polycarbonate resin (A) according to the invention, phenol or a substituted phenol generates as a by-product and unavoidably remains in the polycarbonate resin. However, since phenol and the substituted phenol also have an aromatic ring, there are cases where not only these compounds absorb ultraviolet rays to serve as a factor contributing to a deterioration in light resistance but also the compounds are causative of an odor during molding.

After an ordinary batch reaction, the polycarbonate resin contains an aromatic monohydroxy compound having an aromatic ring, e.g., by-product phenol, in an amount of 1,000 weight ppm or more. From the standpoint of light resistance or odor diminution, it is preferred to reduce the content of the aromatic monohydroxy compound to preferably 700 weight ppm or less, more preferably 500 weight ppm or less, especially 300 weight ppm or less, using a horizontal reactor having excellent volatilizing performance or using an extruder having a vacuum vent. It is, however, noted that it is difficult to industrially completely remove the aromatic monohydroxy compound, and the lower limit of the content thereof is generally 1 weight ppm.

Those aromatic monohydroxy compounds may, of course, have substituents, depending on the starting materials used. For example, the compounds may have an alkyl group having up to 5 carbon atoms or the like.

When the number of moles of the H bonded to the aromatic rings of the polycarbonate resin (A) according to the invention is expressed by (A) and the number of moles of the H bonded to the part other than the aromatic rings is expressed by (B), then the proportion of the number of moles of the H bonded to the aromatic rings to the number of moles of all H is expressed by A/(A+B). Since there is a possibility that the aromatic rings, which have ultraviolet-absorbing ability, might affect light resistance as stated above, it is preferred that A/(A+B) should be 0.1 or less, more preferably 0.05 or less, even more preferably 0.02 or less, especially preferably 0.01 or less. The value of A/(A+B) can be determined by $^1$H-NMR spectroscopy.

<Other Polycarbonate Resins>

The polycarbonate resin compositions of the invention may contain polycarbonate resins other than the polycarbonate resin (A) unless these other polycarbonate resins lessen the effects of the invention. Examples of the polycarbonate resins other than the polycarbonate resin (A) include: aromatic polycarbonate resins having repeating units derived from aromatic bisphenols such as 2,2-bis(4-hydroxyphenyl)propane, 2,2-bis(4-hydroxy-3-methylphenyl)propane, 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl) sulfone, 2,4'-dihyroxydiphenyl sulfone, bis(4-hydroxyphenyl)sulfide, 4,4'-dihydroxydiphenyl ether, 4,4'-dihydroxy-3,3'-dichlorodiphenyl ether, 9,9-bis(4-(2-hydroxyethoxy-2-methyl)phenyl)fluorene, 9,9-bis(4-hydroxyphenyl)fluorene, and 9,9-bis(4-hydroxy-2-methylphenyl)fluorene; polycarbonate resins having repeating units derived from oxyalkylene glycols such as diethylene glycol, triethylene glycol, tetraethylene glycol, polyethylene glycol, and polypropylene glycol; and polycarbonate resins having repeating units derived from compounds which have an aromatic group as a side chain and have, in the main chain, ether groups each bonded to an aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene.

3. Bluing Agent

In the case of the polycarbonate resin composition (I) of the invention, a bluing agent is incorporated in order to eliminate the yellowness attributable to the polymer or the ultraviolet absorber. In the polycarbonate resin composition (I) of the invention, a bluing agent is incorporated usually preferably in an amount of $0.1 \times 10^{-4}$ to $10.0 \times 10^{-4}$ parts by weight per 100 parts by weight of the polycarbonate resin. In case where the amount of the bluing agent incorporated is too small, the effect of eliminating the yellowness is insufficient. Too large amounts thereof tend to result in a decrease in lightness. Too small and too large amounts thereof are hence undesirable.

Meanwhile, in the case of the polycarbonate resin composition (II) of the invention, a bluing agent is suitably selected, regulated, and used so that the incorporation of the bluing agent enables the polycarbonate resin composition (II) to give a 2 mm-thick molded object which has a b* value of −1 to 1 and an L* value of 96.15 or larger.

A bluing agent may be suitably selected from bluing agents in ordinary use in polycarbonate resin compositions and be regulated and used, so long as the polycarbonate resin composition (II) of the invention can be regulated therewith so that the 2 mm-thick molded object formed from the composition has a b* value of −1 to 1 and an L* value of 96.15 or larger. A plurality of bluing agents may be used.

The amount of the bluing agent is not particularly limited so long as the polycarbonate resin composition (II) of the invention can be regulated therewith so that the 2 mm-thick molded object formed from the composition has a b* value of −1 to 1 and an L* value of 96.15 or larger. From the standpoint of regulating the L* value to 96.15 or larger, it is usually preferred that the amount of the bluing agent(s) to be used should be smaller and that the types of bluing agents to be used should be smaller.

More specifically, the amount of the bluing agent incorporated into the polycarbonate resin composition (II) of the invention, per 100 parts by weight of the polycarbonate resin (II), is usually preferably $0.1 \times 10^{-4}$ to $10.0 \times 10^{-4}$ parts by weight, more preferably $0.3 \times 10^{-4}$ to $5.0 \times 10^{-4}$ parts by weight, especially preferably $0.3 \times 10^{4}$ to $2.0 \times 10^{-4}$ parts by weight.

In case where the amount of the bluing agent incorporated is too small, it is difficult to regulate the polycarbonate resin composition (II) so as to give a 2 mm-thick molded object which has a b* value of −1 to 1. Meanwhile, too large incorporation amounts thereof result in a decrease in lightness and, hence, there are cases where it is impossible to regulate the L* value to 96.15 or larger.

In particular, when the polycarbonate resin into which no bluing agent has been incorporated has a large value of b*, a bluing agent must be incorporated in an increased amount in order to produce a polycarbonate resin composition (II) of the invention which gives a 2 mm-thick molded object having a b* value of −1 to 1. However, since an increase in the incorporation amount of the bluing agent tends to result in a decrease in L* value, it is difficult to obtain the polycarbonate resin composition (II) of the invention.

Consequently, for regulating the b* value to −1 to 1 and the L* value to 96.15 or larger, it is important to reduce the amount of Group-1 metals contained in the starting materials, to reduce the amount of aldehyde compounds or monohydroxy compounds contained in the starting materials, to regulate conditions such as the temperature and rate at which the starting materials are introduced, to employ a horizontal reactor, to regulate the temperature conditions or pressure conditions for the polymerization reaction, or to suitably select the kind and amount of a catalyst.

Any bluing agent for polycarbonate resin compositions can be used as the bluing agent for use in the invention, without particularly raising difficulties. From the standpoint of absorption wavelength, however, dyes having an absorption maximum wavelength of 520-600 nm are preferred, and dyes having an absorption maximum wavelength of 540-580 nm are more preferred.

Examples of the dyes having an absorption maximum wavelength of 520-600 nm include monoazo dyes represented by common name Solvent Violet 21, triarylmethane dyes represented by common name Solvent Blue 2 [CA. No. (color index No.) 42563], phthalocyanine dyes represented by common name Solvent Blue 25 [CA. No. 74350], and anthraquinone dyes represented by common name Solvent Violet 13 [CA. No. 60725]. Of these, anthraquinone dyes are easily available and preferred.

Any anthraquinone dye can be used as the bluing agent in the invention so long as the dye has an anthraquinone structure in the molecular structure thereof and is usable for dyeing thermoplastic resins. Of such anthraquinone dyes, compounds represented by the following formula (3) are suitable from the standpoint that the compounds heighten the lightness of the polycarbonate resin composition.

[Chem. 13]

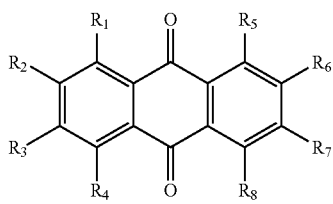

(3)

$R_1$ to $R_8$ in the formula (3) each independently represent a hydrogen atom, a halogen atom, a hydroxyl group, an alkyl group having 1-3 carbon atoms, or an amino group which may have a substituent.

Examples of the substituent which may be possessed by the amino group include alkyl groups or aryl groups. Examples of the alkyl groups which may be possessed as substituents by the amino group include alkyl groups having 1-6 carbon atoms. Examples of the aryl groups which may be possessed as substituents by the amino group include aryl groups having up to three ring structures.

Examples of the aryl groups having up to three ring structures include phenyl, naphthyl, anthryl, and phenanthryl. These aryl groups may have been substituted with an alkyl group having up to 3 carbon atoms. The aryl group which may be possessed as a substituent by the amino group more preferably is phenyl which may have been substituted with one or more alkyl groups, even more preferably is phenyl which may have been substituted with one or more alkyl groups each having up to 3 carbon atoms, and especially preferably is phenyl which has at least one methyl group.

Specific examples of the anthraquinone-based bluing agent, use of which in the invention is preferred, include common name Solvent Violet 13 [CA. No. (color index No.) 60725; trade names "Macrolex Violet B", manufactured by Lanxess AG, "Diaresin Blue G", manufactured by Mitsubishi Chemical Corp., and "Sumiplast Violet B", manufactured by Sumitomo Chemical Co., Ltd.], Solvent Violet 14, common name Solvent Violet 31 [CA. No. 68210; trade name "Diaresin Violet D", manufactured by Mitsubishi Chemical Corp.], Solvent Violet 33 [CA. No. 60725; trade name "Diaresin Blue J", manufactured by Mitsubishi Chemical Corp.], Solvent Violet 36 [CA. No. 68210; trade name "Macrolex Violet 3R", manufactured by Lanxess AG], Solvent Blue 45 [CA. No. 61110; trade name "Tetrazole Blue RLS", manufactured by Sandoz AG], common name Solvent Blue 94 [CA. No. 61500; trade name "Diaresin Blue N", manufactured by Mitsubishi Chemical Corp.], common name Solvent Blue 97 ["Macrolex Blue RR", manufactured by Lanxess AG], common name Solvent Blue 45, common name Solvent Blue 87, and common name Disperse Violet 28.

Preferred of these are common name Solvent Violet 13 ["Macrolex Violet B", manufactured by Lanxess AG], common name Solvent Violet 36 ["Macrolex Violet 3R", manufactured by Lanxess AG], and common name Solvent Blue 97 ["Macrolex Blue RR", manufactured by Lanxess AG]. More preferred is common name Solvent Violet 13 ["Macrolex Violet B", manufactured by Lanxess AG]. Especially preferred of these is the dye having the structure represented by the following formula (8), i.e., common name Solvent Violet 13 [CA. No. (color index No.) 60725; trade names "Macrolex Violet B", manufactured by Lanxess AG, "Diaresin Blue G", manufactured by Mitsubishi Chemical Corp., and "Sumiplast Violet B", manufactured by Sumitomo Chemical Co., Ltd.].

[Chem. 14]

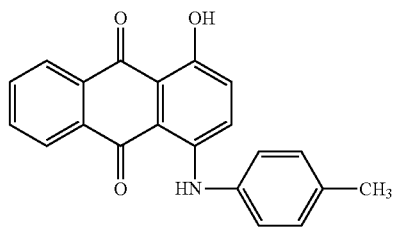

(8)

One of those bluing agents may be used alone, or two or more thereof may be used in combination. However, it is preferred that the amount of the bluing agent(s) to be used should be smaller and that the types of bluing agents to be used should be smaller.

In the invention, the time of incorporating the bluing agent into the polycarbonate resin (A) and methods for the incorporation are not particularly limited. With respect to the time of incorporation, examples of usable methods include: a method in which the bluing agent is added together with starting materials prior to polymerization reaction and the starting materials are polymerized in the presence of the bluing agent; a method in which the bluing agent is incorporated/mixed in a pipeline or by means of an extruder at the time of completion of polymerization reaction; a method in which the bluing agent is incorporated/mixed using an extruder or the like when the polycarbonate resin is in a molten state, for example, when the polycarbonate resin is being kneaded together with other ingredients; and a method in which the bluing agent is blended/kneaded with the polycarbonate resin in a solid state, e.g., in a pellet or powder form. However, to incorporate/mix the bluing agent using an extruder after completion of polymerization reaction is preferred because this method satisfactorily disperse the bluing agent to make it easy to satisfy both the b* value and L*. In an especially preferred method, the polycarbonate resin which is still in the molten state after completion of polycondensation reaction is introduced into an extruder and a bluing agent is incorporated thereinto. This method is preferred because the influences of heat history or oxygen inclusion can be minimized.

Examples of incorporation methods include: a method in which the bluing agent is directly incorporated, through mixing or kneading, into the polycarbonate resin (A); and a method in which the bluing agent is mixed in the form of a high-concentration master batch produced using the bluing agent and a small amount of the polycarbonate resin, another resin, etc.

4. Other Additives

It is preferred that the polycarbonate resin compositions of the invention should further contain an antioxidant. The presence of an antioxidant therein makes it easy to attain both the b* value and L* according to the invention. The content of the antioxidant, per 100 parts by weight of the polycarbonate resin (A), is usually preferably 0.0001-1 part by weight, more preferably 0.0001-0.1 part by weight, even more preferably 0.0002-0.01 part by weight.

In case where the content of the antioxidant in each polycarbonate resin composition is too low, the effect of inhibiting coloring is insufficient and this may result in difficulties in attaining both the b* value and L* according to the invention. In case where the content of the antioxidant is too high, injection molding results in an increased amount of mold deposits or film formation by extrusion molding results in an increased amount of roll deposits. There is hence a possibility that the product might have an impaired surface appearance. In addition, there are cases where too high antioxidant contents result in coloring of the polycarbonate resin or a deterioration in the lightness thereof.

It is preferred that the antioxidant should be at least one member selected from the group consisting of phenolic antioxidants, phosphate-based antioxidants, and sulfur-compound antioxidants. In particular, at least one antioxidant selected from the group consisting of phenolic antioxidants and phosphate-based antioxidants is preferred. From the standpoint of enhancing light resistance, phenolic antioxidants are preferred. From the standpoint of imparting a preferred initial color tone, phosphate-based antioxidants are preferred. It is especially effective to use a phenolic antioxidant and a phosphate-based antioxidant in combination.

Examples of the phenolic antioxidants include compounds such as pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], pentaerythritol tetrakis [3-(3,5-di-tert-butyl-4-hydroxyphenyl) propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamamide), diethyl 3,5-di-tert-butyl-4-hydroxybenzylphosphonate, tris(3,5-di-tert-butyl-4-hydroxybenzyl) isocyanurate, tetrakis(2,4-di-tert-butylphenyl) 4,4'-biphenylenediphosphinate, and 3,9-bis{1,1-dimethyl-2-[β-(3-tert-butyl-4-hydroxy-5-methylphenyl) propionyloxy]ethyl}-2,4,8,10-tetraoxaspiro(5,5)undecane.

Preferred of these compounds are the aromatic monohydroxy compounds substituted with one or more alkyl groups having 5 or more carbon atoms. Specifically, octadecyl 3-(3,5-di-tert-butyl-4-hydroxyphenyl)propionate, pentaerythrityl tetrakis {3-(3,5-di-t-butyl-4-hydroxyphenyl)propionate}, 1,6-hexanediol bis[3-(3,5-di-tert-butyl-4-hydroxyphenyl) propionate], 1,3,5-trimethyl-2,4,6-tris(3,5-di-tert-butyl-4-hydroxybenzyl)benzene, and the like are preferred. More preferred is pentaerythrityl tetrakis {3-(3,5-di-t-butyl-4-hydroxyphenyl)propionate}.

Examples of the phosphate-based antioxidants include triphenyl phosphite, tris(nonylphenyl)phosphite, tris(2,4-di-tert-butylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl) pentaerythritol diphosphite, 2,2-methylenebis(4,6-di-tert-butylphenyl) octyl phosphite, bis(nonylphenyl) pentaerythritol diphosphite, bis(2,4-di-tert-butylphenyl) pentaerythritol diphosphite, and distearyl pentaerythritol diphosphite.

Preferred of these are trisnonylphenyl phosphite, trimethyl phosphate, tris(2,4-di-tert-butylphenyl) phosphite, bis(2,4-di-tert-butylphenyl) pentaerythritol diphosphite, and bis(2,6-di-tert-butyl-4-methylphenyl) pentaerythritol diphosphite. More preferred is tris(2,4-di-tert-butylphenyl) phosphite.

Examples of the sulfur-compound antioxidants include dilauryl 3,3'-thiodipropionate, ditridecyl 3,3'-thiodipropionate, dimyristyl 3,3'-thiodipropionate, distearyl 3,3'-thiodipropionate, lauryl stearyl 3,3'-thiodipropionate, pentaerythritol tetrakis(3-laurylthiopropionate), bis[2-methyl-4-(3-laurylthiopropionyloxy)-5-tert-butylphenyl]sulfide, octadecyl disulfide, mercaptobenzimidazole, 2-mercapto-6-methylbenzimidazole, and 1,1'-thiobis(2-naphthol). Preferred of these is pentaerythritol tetrakis(3-laurylthiopropionate).

In the invention, the time of incorporating the antioxidant into the polycarbonate resin (A) and methods for the incorporation are not particularly limited. Examples of the time of incorporation include the time when polymerization reaction is completed, in the case where the polycarbonate resin was produced by a transesterification method. Examples thereof further include, regardless of polymerization method: the time when the polycarbonate resin is in a molten state, for example, during kneading of the polycarbonate resin and other ingredients; and the time when the polycarbonate resin in a solid state, e.g., in a pellet or powder form, is blended with other ingredients and kneaded using an extruder or the like.

Examples of incorporation methods include: a method in which the antioxidant is directly incorporated, through mixing or kneading, into the polycarbonate resin (A); and a method in which the antioxidant is mixed in the form of a high-concentration master batch produced using the antioxidant and a small amount of the polycarbonate resin, another resin, etc.

It is preferred that the polycarbonate resin compositions of the invention should further contain a hindered-amine stabilizer.

The content of the hindered-amine stabilizer, per 100 parts by weight of the polycarbonate resin (A) in each polycarbonate resin composition, is usually preferably 0.0001-1 part by weight, more preferably 0.0001-0.1 part by weight, even more preferably 0.0002-0.01 part by weight.

In case where the content of the hindered-amine stabilizer in each polycarbonate resin composition is too low, the effect of improving light resistance cannot be sufficiently obtained. In case where the content of the hindered-amine stabilizer is too high, injection molding results in an increased amount of mold deposits or film formation by extrusion molding results in an increased amount of roll deposits. There is hence a possibility that the product might have an impaired surface appearance. In addition, there are cases where too high contents thereof result in coloring of the polycarbonate resin or a deterioration in the lightness thereof.

Examples of the hindered-amine stabilizer include bis(2,2,6,6-tetramethyl-4-piperidyl) sebacate, bis(1,2,2,6,6-pentamethyl-4-piperidyl) sebacate, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidy)imino}], N,N'-bis(3-aminopropyl) ethylenediamine-2,4-bis[N-butyl-N-(1,2,2,6,6-pentamethyl-4-piperidylamino)-6-chloro-1,3,5-triazine condensates, and polycondensates of dibutylamine, 1,3,5-triazine, or N,N'-bis (2,2,6,6)-tetramethyl-4-piperidyl-1,6-hexamethylenediamine with N-(2,2,6,6-tetramethyl-4-piperidyl)butylamine.

Two or more of these hindered-amine stabilizers may be used in combination. Preferred of these are bis(2,2,6,6-tetramethyl-4-piperidyl) sebacate and bis(1,2,2,6,6-pentamethyl-4-piperidyl) sebacate.

In the invention, the time of incorporating the hindered-amine stabilizer into the polycarbonate resin (A) and methods for the incorporation are not particularly limited. Examples of the time of incorporation include the time when polymerization reaction is completed, in the case where the polycarbonate resin was produced by a transesterification method. Examples thereof further include, regardless of polymerization method: the time when the polycarbonate resin is in a molten state, for example, during kneading of the polycarbonate resin and other ingredients; and the time when the polycarbonate resin in a solid state, e.g., in a pellet or powder form, is blended with other ingredients and kneaded using an extruder or the like.

Examples of incorporation methods include: a method in which the hindered-amine stabilizer is directly incorporated, through mixing or kneading, into the polycarbonate resin (A); and a method in which the hindered-amine stabilizer is mixed in the form of a high-concentration master batch produced using the stabilizer and a small amount of the polycarbonate resin, another resin, etc.

The polycarbonate resin compositions of the invention may further contain an acidic compound. The amount of at least one acidic compound to be incorporated per 100 parts by weight of the polycarbonate resin is preferably 0.00001-0.1 part by weight, more preferably 0.0001-0.01 part by weight, even more preferably 0.0002-0.001 part by weight.

When the amount of the acidic compound incorporated into each polycarbonate resin composition is too small, there are cases where the polycarbonate resin composition, during injection molding, cannot be sufficiently inhibited from taking a color when the composition stagnates in the injection molding machine over a long period. Meanwhile, when the incorporation amount of the acidic compound is too large, there are cases where this polycarbonate resin composition has considerably reduced hydrolytic resistance.

Examples of the acidic compound include Brønsted acids such as hydrochloric acid, nitric acid, boric acid, sulfuric acid, sulfurous acid, phosphoric acid, phosphorous acid, hypophosphorous acid, polyphosphoric acid, adipic acid, ascorbic acid, aspartic acid, azelaic acid, adenosine phosphate, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid, and maleic acid and esters thereof.

Preferred of these acidic compounds or derivatives thereof are the sulfonic acids or esters thereof. Especially preferred of these are p-toluenesulfonic acid, methyl p-toluenesulfonate, and butyl p-toluenesulfonate.

These acidic compounds can be added, in steps for producing each polycarbonate resin composition, as compounds for neutralizing the basic transesterification catalyst used in the polycondensation reaction for polycarbonate resin production described above.

The polycarbonate resin compositions of the invention can contain an antistatic agent unless the incorporation thereof defeats the objects of the invention.

The polycarbonate resin compositions of the invention can contain an ultraviolet absorber and a light stabilizer unless these stabilizers defeat the objects of the invention. The content of these stabilizers per 100 parts by mass of the polycarbonate resin (A) is preferably 0.01 part by weight to 2 parts by mass.

The polycarbonate resin compositions of the invention may contain an inorganic filler. The amount of the inorganic filler to be incorporated per 100 parts by weight of the polycarbonate resin (A) is usually preferably 1-100 parts by weight, more preferably 3-50 parts by weight. Too large incorporation amounts of the inorganic filler tend to result in an insufficient reinforcing effect. Too large incorporation amounts thereof tend to result in an impaired appearance.

Examples of the inorganic filler include glass fibers, milled glass fibers, glass flakes, glass beads, carbon fibers, silica, alumina, titanium oxide, calcium sulfate powder, gypsum, gypsum whiskers, barium sulfate, talc, mica, calcium silicate such as wollastonite, carbon black, graphite, iron powder, copper powder, molybdenum disulfide, silicon carbide, silicon carbide fibers, silicon nitride, silicon nitride fibers, brass fibers, stainless-steel fibers, and potassium titanate fibers and whiskers.

Preferred of these are: the fibrous fillers of glass, powdery filler of glass, and flaky filler of glass; the fibrous filler of carbon, powdery filler of carbon, and flaky filler of carbon; and the various whiskers, mica, and talc. More preferred are glass fibers, glass flakes, milled glass fibers, carbon fibers, wollastonite, mica, and talc.

The polycarbonate resin compositions of the invention can be kneaded together with one or more of synthetic resins, e.g., aromatic polycarbonates, aromatic polyesters, aliphatic polyesters, polyamides, polystyrene, polyolefins, acrylics, amorphous polyolefins, ABS, and AS, biodegradable resins, e.g., poly(lactic acid) and poly(butylenes succinate), rubbers, etc. and used as a polymer alloy.

5. Process for Producing the Polycarbonate Resin Compositions

The polycarbonate resin compositions of the invention each can be produced by mixing the ingredients either simultaneously or in any desired order by means of a mixer, e.g., a tumbling mixer, twin-cylinder mixer, Nauta mixer, Banbury mixer, kneading rolls, or extruder. The compositions may contain additives in general use in resin compositions, such as, for example, a nucleating agent, flame retardant, inorganic filler, impact modifier, foaming agent, and dye or pigment, so long as these additives do not defeat the objects of the invention.

6. Hydrolytic Resistance of the Polycarbonate Resin Compositions of the Invention The polycarbonate resin compositions of the invention are resin compositions having excellent hydrolytic resistance. This hydrolytic resistance can be evaluated by a method in which the initial reduced viscosity of each polycarbonate resin composition of the invention and the reduced viscosity of the composition that has undergone a test in which the composition is held at a given saturated vapor pressure for a given period are measured in the same manner as in the measurement of the reduced viscosity of the polycarbonate resin (A) according to the invention, and the hydrolytic resistance of the composition is evaluated in terms of the resultant change in reduced viscosity.

The change in reduced viscosity can be expressed in terms of the retention of reduced viscosity obtained from the values of reduced viscosity measured before and after the test. The retention of reduced viscosity, through holding in saturated water vapor having a temperature of 120° C. and a pressure of 0.12 MPa, is preferably 95% or higher, more preferably 96% or higher. By regulating the retention of reduced viscosity to 95% or higher, this polycarbonate resin composition can be prevented from decreasing in molecular weight with the lapse of use time and the molded object can be made to have improved mechanical strength. The upper limit of the retention of reduced viscosity is 100%.

The retention of reduced viscosity can be expressed by the following equation.

$$\text{Retention of reduced viscosity}(\%) = \{(\eta sp/c)2/(\eta sp/c)1\} \times 100$$

(In the equation, "($\eta sp/c$)2" indicates the reduced viscosity of a flat plate of the polycarbonate resin composition as measured after the flat plate has been held for 48 hours in saturated water vapor having a temperature of 120° C. and a pressure of 0.12 MPa, and "($\eta sp/c$)1" indicates the reduced viscosity thereof as measured before the test.)

7. Haze of the Polycarbonate Resin Compositions

Especially when the polycarbonate resin compositions of the invention are to be used in applications such as sunglasses, sports goggles, spectacle lenses, and containers for liquids, the haze thereof as measured immediately after production is preferably 10% or less, more preferably 9% or less, especially preferably 4% or less.

The haze thereof, as measured after the sunshine weatherometer irradiation test which will be described later in the section Examples, is preferably 20% or less, in particular 18% or less, especially preferably 13% or less.

The haze of each polycarbonate resin composition can be regulated so as to be within such preferred range, by suitably regulating the kinds of the dihydroxy compounds to be used for producing the polycarbonate resin (A) or suitably regulating the molecular weight, etc. of the polycarbonate resin (A).

8. Molded Polycarbonate Resin Articles

In this embodiment, molded polycarbonate resin articles are obtained by molding the polycarbonate resin compositions described above. Although molding methods for producing the molded polycarbonate resin articles are not particularly limited, injection molding is preferred.

According to the invention, polycarbonate resin compositions which are excellent in terms of light resistance, transparency, hue, heat resistance, thermal stability, and mechanical strength can be provided.

It is preferred that the molded polycarbonate resin articles of the invention obtained by molding the polycarbonate resin compositions of the invention should have a pencil hardness, as measured by the method which will be described later in the section Examples, of F or higher. The pencil hardness is affected by the proportion of the structural units which each are derived from a dihydroxy compound and which constitute the polycarbonate resin (A) contained in each polycarbonate resin composition of the invention. The higher the proportion thereof, the higher the pencil hardness. However, the proportion thereof is regulated while taking account of a balance between pencil hardness and other properties.

EXAMPLES

The invention will be explained below by reference to Examples, but the invention should not be construed as being limited by the following Examples unless the invention departs from the spirit thereof.

In the following Examples, properties of polycarbonates were evaluated by the following methods.

(1) Measurement of Oxygen Concentration

The oxygen concentration in the polymerizer was measured using an oxygen analyzer (1000RS, manufactured by AMI Inc.).

(2) Measurement of Reduced Viscosity

A sample of a polycarbonate resin was dissolved using methylene chloride as a solvent to prepare a polycarbonate solution having a concentration of 0.6 g/dL. Using an Ubbelohde viscometer manufactured by Moritomo Rika Kogyo, a measurement was made at a temperature of 20.0±0.1° C. The relative viscosity $\eta rel$ was determined from the flow-down time of the solvent $t_0$ and the flow-down time of the solution $t$ using the following equation.

$$\eta rel = t/t_0$$

The specific viscosity $\eta sp$ was determined from the relative viscosity using the following equation.

$$\eta sp = (\eta - \eta_0)/\eta_0 = \eta rel - 1$$

The specific viscosity was divided by the concentration c (g/dL) to determine the reduced viscosity $\eta sp/c$. The larger the value thereof, the higher the molecular weight.

(3) Determination of Proportion of Structural Units Derived from Each Dihydroxy Compound in Polycarbonate Resin and Determination of Concentration of Terminal Phenyl Groups The proportion of structural units of each dihydroxy compound in a polycarbonate resin was determined in the following manner. A 30-mg portion of the polycarbonate resin was weighed out and dissolved in about 0.7 mL of deuterated chloroform to obtain a solution. This solution was introduced into a tube for NMR spectroscopy having an inner diameter of 5 mm and examined for $^1$H NMR spectrum at ordinary temperature using JNM-AL400 (resonance frequency, 400 MHz), manufactured by JEOL Ltd. The proportion of structural units derived from each dihydroxy compound was determined from the ratio among the intensities of the structural-unit signals attributable to respective dihydroxy compounds.

With respect to the concentration of terminal phenyl groups, a sample was examined for $^1$H-NMR spectrum in the same manner as described above using 1,1,2,2-tetrabromoethane as an internal reference. The concentration thereof was determined from the intensity ratio of the signal assigned to the internal reference to the signal assigned to terminal phenyl groups.

(4) Determination of Metal Concentration in Polycarbonate Resin

About 0.5 g of polycarbonate resin pellets were precisely weighed in a microwave decomposition vessel manufactured by PerkinElmer, Inc., and 2 mL of 97% sulfuric acid was added thereto. This vessel was sealed and heated with microwaves at 230° C. for 10 minutes. After the vessel was cooled to room temperature, 1.5 mL of 68% nitric acid was added to the contents. This vessel was sealed, heated with microwaves at 150° C. for 10 minutes, and then cooled again to room temperature. Thereto was added 2.5 mL of 68% nitric acid. This vessel was sealed again and heated with microwaves at 230° C. for 10 minutes to completely decompose the contents. After the vessel was cooled to room temperature, the liquid thus obtained was diluted with pure water. The concentration of metals therein was determined with an ICP-MS apparatus manufactured by ThermoQuest Corp.

(5) Determination of Content of Aromatic Monohydroxy Compound in Polycarbonate Resin and Content of Carbonic Diester represented by General Formula (2) therein A 1.25-g portion of a polycarbonate resin sample was dissolved in 7 mL of methylene chloride to obtain a solution. Thereafter, a reprecipitation treatment was conducted by adding acetone thereto so as to result in a total amount of 25 mL. Subsequently, the treated liquid was filtered through a 0.2-μm disk filter, and the filtrate was subjected to quantitative analysis by liquid chromatography.

(6) Method for Evaluating Initial Hue of Polycarbonate Resin Composition

Pellets of a polycarbonate resin composition were dried at 110° C. for 10 hours in a nitrogen atmosphere. Subsequently, the dried polycarbonate resin composition pellets were fed to an injection molding machine (Type J75EII, manufactured by The Japan Steel Works, Ltd.), and an operation for forming an injection-molded piece (60 mm (width)×60 mm (length)×3 mm (thickness)) under the conditions of a resin temperature of 220° C. and a molding cycle of 23 seconds was repeated. The injection-molded pieces obtained by the 10th shot to the 20th shot were examined for yellowness index (initial YI) value and L* value with respect to thickness-direction transmitted light using a color tester (CM-3700d, manufactured by Konica Minolta Inc.), and average values thereof were calculated. The smaller the YI value, the less the yellowness and the better the quality. The larger the L* value, the higher the lightness.

(7) Method for Evaluating Hue of Polycarbonate Resin Composition Stagnated in Heated State In the evaluation of the initial hue of a polycarbonate resin composition described above, the cycle of molding for forming an injection-molded piece by means of the injection molding machine was changed to 60 seconds after the 20th shot and this molding operation was repeated until the 30th shot. The injection-molded article obtained by the 30th shot was examined for YI value (YI value after high-temperature stagnation test) with respect to thickness-direction transmitted light using the color tester.

(8) Measurement of Light Transmittance at Wavelengths of 350 Nm and 320 Nm

Injection-molded pieces obtained in (6) above (60 mm (width)×60 mm (length)×3 mm (thickness); 10th shot to 20th shot) were examined for thickness-direction light transmittance using a spectrophotometer for ultraviolet and visible region (U2900, manufactured by Hitachi High-Technologies Corp.), and average values thereof were calculated to evaluate the injection-molded articles.

(9) Ratio of the Number of Moles of H Bonded to Aromatic Rings (A) to the Number Of Moles of all H (A+B) (B is the Number of Moles of H not Bonded to Aromatic Rings)

Deuterated chloroform alone, to which tetramethylsilane (TMS) had been added beforehand as an internal reference, was examined for spectrum, and the signal ratio of the TMS to the residual H contained in the deuterated chloroform was determined. Subsequently, 30 mg of a polycarbonate resin was weighed out and dissolved in about 0.7 mL of the deuterated chloroform. This solution was introduced into a tube for NMR spectroscopy having an inner diameter of 5 mm and examined for $^1$H NMR spectrum at ordinary temperature using JNM-AL400 (resonance frequency, 400 MHz), manufactured by JEOL Ltd.

The integral of the signal assigned to the residual H contained in the deuterated chloroform (determined from the integral of the signal assigned to the TMS and from the ratio of the TMS to the residual H contained in the deuterated chloroform, the ratio having been determined above) is subtracted from the integral of the signal appearing at 6.5-8.0 ppm on the NMR chart obtained, and the value thus obtained is expressed by a. Meanwhile, the integral of the signals appearing at 0.5-6.5 ppm is expressed by b. Since a/(a+b)=A/(A+B), this value was determined.

(10) Metal Halide Lamp Irradiation Test

Metaling Weather Meter M6T, manufactured by Suga Test Instruments Co., Ltd., was used, in which a horizontal Metaling lamp was attached as a light source, quartz was attached as an inner filter, and a filter #500 was attached as an outer filter around the lamp. This apparatus was set so as to result in an irradiance for the wavelength range 300-400 nm of 1.5 kW/m$^2$, and a square surface of the flat plate (60 mm (width)× 60 mm (length)×3 mm (thickness)) obtained by the 20th shot in (6) above was subjected to a 100-hour irradiation treatment with the apparatus under the conditions of 63° C. and a relative humidity of 50%. The YI value after the irradiation was measured in the same manner as in (6) above.

(11) Hue Measurement

In accordance with JIS K7105 (1981), injection-molded pieces (40 mm (width)×65 mm (length)×2 mm (thickness)) were examined for yellowness index (YI) value by the illuminant-C transmission method using a color-difference spectrometer (SE2000, manufactured by Nippon Denshoku Kogyo K. K.). The smaller the YI value, the less the yellowness and the better the quality.

The yellowness index (initial YI) value, L* value, and b* value of the injection-molded pieces were measured with respect to thickness-direction transmitted light using a color tester (CM-3700d, manufactured by Konica Minolta Inc.), and average values thereof were calculated. The larger the L* value or the larger the b* value, the higher the yellowness.

(12) Haze

In accordance with JIS K7105, the injection-molded pieces were examined for haze using a hazeometer (NDH2000, manufactured by Nippon Denshoku Kogyo K. K.) and using illuminant D65.

(13) Hydrolytic Resistance Test

The flat plate was held for 48 hours in saturated water vapor having a temperature of 120° C. and a pressure of 212 kPa and then examined for reduced viscosity [(ηsp/c)2]. The retention based on the reduced viscosity as measured before the test [(ηsp/c)1] was determined using the following equation.

$$\text{Retention of reduced viscosity}(\%) = \{(\eta sp/c)2/(\eta sp/c)1\} \times 100$$

(14) Sunshine Weatherometer Irradiation Test

In accordance with JIS B7753 (2007), sunshine weatherometer S80, manufactured by Suga Test Instruments Co., Ltd., was used to conduct the test in the following manner. A sunshine carbon arc illuminant (four pairs of ultralong-life carbon lamps) was set so as to have a discharge voltage of 50 V and a discharge current of 60 A. In the irradiation/surface spraying (rainfall) mode, a square surface of an injection-molded flat plate (60 mm (width)×60 mm (length)×3 mm (thickness)) was subjected to a 500-hour irradiation treatment under the conditions of a black panel temperature of 63° C. and a relative humidity of 50%. The period of surface spraying (rainfall) was set at 12 minutes per hour. As the glass filter, type A was used. After the irradiation treatment, the haze of the flat plate was measured.

(15) Pencil Hardness

Each of the injection-molded pieces which will be described later (40 mm (width)×65 mm (length)×2 mm (thickness)) was examined in a 23° C. thermostatic room using as a measuring apparatus a pencil-scratch coating film hardness tester manufactured by Toyo Seiki Ltd., in accordance with JIS K5600 5.4 (1999) "Scratch Hardness (pencil method)" under the following conditions.

Load: 750 g
Measuring speed: 30 mm/min
Measuring distance: 7 mm

As pencils, use was made of UNI pencils (hardness: 4H, 3H, 2H, H, F, HB, B, 2B, 3B, and 4B), manufactured by Mitsubishi Pencil Co., Ltd. The measurement was made five times, and the hardness which was softer by one grade than the pencil hardness at which an injection-molded piece received a scratch two or more times was taken as the pencil hardness of the injection-molded piece.

The following abbreviations and the like were used for compounds used in the following Production Examples and Examples.

ISB: Use was made of purified isosorbide obtained by distilling isosorbide (trade name POLYSORB, manufactured by Roquette Freres) in a nitrogen stream first at an internal temperature of 160° C. and a pressure of 133-266 Pa to remove the initial distillate and then at an internal temperature of 160-170° C., a column top temperature of 150-157° C., and a pressure of 133 Pa. (About 10% was left as bottoms.)

PC2: An aromatic polycarbonate resin having structures derived from (2,2-bis(4-hydroxyphenyl)propane as the only structures (trade name Novarex 7022J, manufactured by Mitsubishi Engineering-Plastics Corp.; viscosity-average molecular weight, 22,000)

Bluing agent 1: Solvent Violet 13 (trade name Macrolex Violet B, manufactured by Lanxess AG; absorption maximum wavelength, 587 nm)

Bluing agent 2: Solvent Blue 97 (trade name Macrolex Blue RR, manufactured by Lanxess AG)

Bluing agent 3: Solvent Violet 36 (trade name Macrolex Violet 3R, manufactured by Lanxess AG; absorption maximum wavelength, 558 nm)

Antioxidant 1: Hindered-phenol antioxidant (trade name Irganox 1010, manufactured by BASF Japan Ltd.)

Antioxidant 2: Phosphorus-compound antioxidant (trade name Irganox 168, manufactured by BASF Japan Ltd.)

Stabilizer: Hindered-amine stabilizer (trade name Tinuvin 765, manufactured by BASF Japan Ltd.)

Production Example 1

Production of Polycarbonate Resin (A)

Into a polymerizer equipped with a stirrer and a reflux condenser regulated so as to have a temperature of 100° C. were introduced ISB, CHDM, DPC which had been purified by distillation to a chloride ion concentration of 10 ppb or less, and calcium acetate monohydrate so that the ISB/CHDM/DPC/calcium acetate monohydrate molar ratio was $0.50/0.50/1.00/6.5\times10^{-7}$. Nitrogen displacement was sufficiently conducted.

Subsequently, the contents were heated with a heat medium, and stirring was initiated at the time when the internal temperature reached 100° C. While regulating the system so as to maintain the internal temperature of 100° C., the contents were melted and homogenized. Thereafter, heating was initiated to elevate the internal temperature to 210° C. over 40 minutes. At the time when the internal temperature reached 210° C., the system was regulated so as to maintain the temperature and, simultaneously therewith, pressure reduction was initiated. The pressure was reduced to 13.3 kPa (absolute pressure; the same applies hereinafter) over 90 minutes after the temperature of 210° C. had been reached, and the contents were held for further 30 minutes while maintaining the pressure.

The phenol vapor which generated as a by-product with the progress of the polymerization reaction was introduced into the reflux condenser, in which steam regulated so as to have a temperature of 100° C. at the inlet of the reflux condenser was used as a coolant, and the monomer ingredients contained in a small amount in the phenol vapor were returned to the polymerizer. The phenol vapor, which remained uncondensed, was subsequently introduced into a condenser that employed 45° C. warm water as a coolant, and recovered.

The contents which had been thus oligomerized were temporarily returned to atmospheric pressure and then transferred to another polymerizer equipped with a stirrer and a reflux condenser regulated in the same manner as described above. Heating and pressure reduction were initiated, and the internal temperature and the pressure were changed to 210° C. and 200 Pa, respectively, over 60 minutes. Thereafter, the internal temperature and the pressure were changed to 220° C. and 133 Pa or lower, respectively, over 20 minutes. At the time when a given stirring power had been reached, the pressure was returned to atmospheric pressure, and the molten-state polycarbonate resin was discharged through the outlet of the polymerizer and pelletized with a pelletizer to obtain pellets.

This polycarbonate resin is referred to as "PC1". "PC1" had a reduced viscosity of 0.623 dL/g.

Production Example 2

Production of Polycarbonate Resin (A)

Into a polymerizer equipped with a stirrer and a reflux condenser regulated so as to have a temperature of 100° C. were introduced ISB, CHDM, DPC which had been purified by distillation to a chloride ion concentration of 10 ppb or less, and cesium carbonate so that the ISB/CHDM/DPC/cesium carbonate molar ratio was $0.50/0.50/1.00/2.4\times10^{-6}$. Nitrogen displacement was sufficiently conducted.

Subsequently, the contents were heated with a heat medium, and stirring was initiated at the time when the internal temperature reached 100° C. While regulating the system so as to maintain an internal temperature of 150° C., the contents were melted and homogenized. Subsequently, the pressure was reduced from ordinary pressure to 13.3 kPa, and the internal temperature was thereafter elevated to 190° C. over 60 minutes. After the internal temperature had reached 190° C., the contents were held for 15 minutes.

The phenol vapor which generated as a by-product with the progress of the polymerization reaction was introduced into the reflux condenser, in which steam regulated so as to have a temperature of 100° C. at the inlet of the reflux condenser was used as a coolant, and the monomer ingredients contained in a small amount in the phenol vapor were returned to the polymerizer. The phenol vapor, which remained uncondensed, was subsequently introduced into a condenser that employed 45° C. warm water as a coolant, and recovered.

The contents which had been thus oligomerized were temporarily returned to atmospheric pressure and then transferred to another polymerizer equipped with a stirrer and a reflux condenser regulated in the same manner as described above. Heating and pressure reduction were initiated, and the internal temperature and the pressure were changed to 230° C. and 6.67 kPa, respectively, over 15 minutes. Thereafter, the internal temperature and the pressure were changed to 250° C. and 200 Pa or lower, respectively, over 8 minutes. At the time when a given stirring power had been reached, the pressure was returned to atmospheric pressure, and the molten-state polycarbonate resin was discharged through the outlet of the polymerizer and pelletized with a pelletizer to obtain pellets.

This polycarbonate resin is referred to as "PC3". "PC3" had a reduced viscosity of 0.630 dL/g.

Example 1-1

Into a polymerizer equipped with a stirrer and a reflux condenser regulated so as to have a temperature of 100° C. were introduced ISB, CHDM, DPC which had been purified by distillation to a chloride ion concentration of 10 ppb or less, and calcium acetate monohydrate so that the ISB/CHDM/DPC/calcium acetate monohydrate molar ratio was $0.69/0.31/1.00/1.3\times10^{-6}$. Nitrogen displacement was sufficiently conducted (oxygen concentration, 0.0005-0.001 vol %). Subsequently, the contents were heated with a heat medium, and stirring was initiated at the time when the internal temperature reached 100° C. While regulating the system so as to maintain the internal temperature of 100° C., the contents were melted and homogenized.

Thereafter, heating was initiated to elevate the internal temperature to 210° C. over 40 minutes. At the time when the internal temperature reached 210° C., the system was regulated so as to maintain the temperature and, simultaneously therewith, pressure reduction was initiated. The pressure was reduced to 13.3 kPa (absolute pressure; the same applies hereinafter) over 90 minutes after the temperature of 210° C. had been reached, and the contents were held for further 60 minutes while maintaining the pressure.

The phenol vapor which generated as a by-product with the progress of the polymerization reaction was introduced into the reflux condenser, in which steam regulated so as to have a temperature of 100° C. at the inlet of the reflux condenser was used as a cooling medium, and the monomer ingredients contained in a small amount in the phenol vapor were returned to the polymerizer. The phenol vapor, which remained uncondensed, was subsequently introduced into a condenser that employed 45° C. warm water as a coolant, and recovered.

The contents which had been thus oligomerized were temporarily returned to atmospheric pressure and then transferred to another polymerizer equipped with a stirrer and a reflux condenser regulated in the same manner as described above. Heating and pressure reduction were initiated, and the internal temperature and the pressure were changed to 220° C. and 200 Pa, respectively, over 60 minutes. Thereafter, the internal temperature and the pressure were changed to 228° C. and 133 Pa or lower, respectively, over 20 minutes. At the time when a given stirring power had been reached, the pressure was returned to atmospheric pressure, and a molten-state polycarbonate resin was obtained through the outlet of the polymerizer.

Furthermore, the molten-state polycarbonate resin was continuously fed to a twin-screw extruder equipped with three vents and with a water injection system. "Macrolex Blue RR" and "Macrolex Violet 3R", both manufactured by Lanxess AG, were continuously added thereto as bluing agents, and "Irganox 1010" and "Irgafos 168" also were continuously added thereto as antioxidants, in given proportions so as to result in the makeup shown in Table 1. Simultaneously therewith, low-molecular substances including phenol were removed under vacuum through the vents of the twin-screw extruder. Thereafter, the mixture was pelletized with a pelletizer to obtain pellets of a polycarbonate resin composition. The polycarbonate resin composition obtained was evaluated for various properties, etc. by the evaluation methods described above. The results obtained are shown in Table 1.

Examples 1-2 and 1-3

The same procedure as in Example 1-1 was conducted, except that the concentrations of the bluing agents in Example 1-1 were changed.

Comparative Example 1-1

The same procedure as in Example 1-1 was conducted, except that the bluing agents used in Example 1-1 were not added.

Comparative Example 1-2

The same procedure as in Example 1-1 was conducted, except that cesium carbonate was used in place of the calcium acetate monohydrate.

Incidentally, with respect to the content of aromatic monohydroxy compounds in the Examples and Comparative Examples, substantially most of the monohydroxy compounds were accounted for by phenol. Similarly, with respect to the content of carbonic diesters, substantially most of the carbonic diesters were accounted for by DPC.

TABLE 1

| | | | | | Example 1-1 | Example 1-2 | Example 1-3 | Comparative Example 1-1 | Comparative Example 1-2 |
|---|---|---|---|---|---|---|---|---|---|
| Polycarbonate resin composition | Polycarbonate resin | Amount of catalyst used (metal amount) | Ca | µmol/dihydroxy compounds | 1.3 | 1.3 | 1.3 | 1.3 | — |
| | | | Cs | | — | — | — | — | 1.3 |
| | | Proportion of structural units derived from dihydroxy compound | ISB | mol % | 69.9 | 69.9 | 69.9 | 69.9 | 69.9 |
| | | | CHDM | | 30.1 | 30.1 | 30.1 | 30.1 | 30.1 |
| | | Concentration of Na, K, and Cs (total) | | weight ppm | 0.6 | 0.6 | 0.6 | 0.6 | 1.5 |
| | | Concentration of Li | | weight ppm | <0.05 | <0.05 | <0.05 | <0.05 | <0.05 |
| | | Reduced viscosity | | dL/G | 0.48 | 0.48 | 0.48 | 0.48 | 0.50 |
| | | Content of aromatic monohydroxy compounds | | weight ppm | 205 | 205 | 205 | 205 | 209 |
| | | Content of carbonic diester of general formula (2) | | weight ppm | 26 | 26 | 26 | 26 | 24 |
| | | Concentration of terminal phenyl groups | | µeq/g | 75 | 75 | 75 | 75 | 90 |
| | | A/(A + B) | | mol/mol | 0.007 | 0.007 | 0.007 | 0.007 | 0.008 |
| | Bluing agent | Macrolex Blue RR | | parts by weight | $0.5 \times 10^{-4}$ | $1.0 \times 10^{-4}$ | $1.5 \times 10^{-4}$ | — | $1.0 \times 10^{-4}$ |
| | | Macrolex Violet 3R | | parts by weight | $0.5 \times 10^{-4}$ | $1.0 \times 10^{-4}$ | $1.5 \times 10^{-4}$ | — | $1.0 \times 10^{-4}$ |
| | Other additives | Irganox 1010 | | parts by weight | 0.1 | 0.1 | 0.1 | 0.1 | 0.1 |
| | | Irgafos 168 | | parts by weight | 0.05 | 0.05 | 0.05 | 0.05 | 0.05 |
| Molded article | | Light transmittance at 350 nm | | % | 80 | 80 | 80 | 80 | 48 |
| | | Light transmittance at 320 nm | | % | 60 | 60 | 60 | 60 | 15 |
| | | L* value | | — | 96.0 | 95.2 | 94.4 | 96.8 | 94.2 |
| | | Initial YI value | | — | 3.2 | 2.4 | 1.4 | 4.1 | 7.9 |
| | | YI value after treatment with metal halide lamp irradiation | | — | 4.8 | 3.7 | 2.4 | 6.0 | 14.0 |
| | | Difference in YI value between before and after treatment with metal halide lamp irradiation | | — | 1.6 | 1.3 | 1.0 | 1.9 | 6.1 |

TABLE 1-continued

|  | Example 1-1 | Example 1-2 | Example 1-3 | Comparative Example 1-1 | Comparative Example 1-2 |
|---|---|---|---|---|---|
| YI value after high-temperature stagnation test | — | 3.8 | 3.7 | 3.6 | 3.8 | 8.7 |

In the table,
A is the number of moles of hydrogen atoms bonded to the aromatic rings of the polycarbonate resin,
B is the number of moles of hydrogen atoms bonded to the part other than the aromatic rings of the polycarbonate resin.

As shown in Table 1, it was found that the molded objects obtained from the polycarbonate resin compositions of the invention, which each included a polycarbonate resin (A) and a specific amount of bluing agents, not only had excellent light resistance but also were excellent in terms of transparency, hue, heat resistance, and thermal stability.

Example 2-1

Pellets of PC1 were fed to a twin-screw extruder equipped with vents and having a set barrel temperature of 240° C. "Macrolex Violet B" as a bluing agent and "Irganox 1010" and "Irgafos 168" as antioxidants were continuously added thereto in the proportions shown in Table 2 so as to result in the makeup shown in Table 2. Simultaneously therewith, low-molecular substances including phenol were removed under vacuum through the vents of the twin-screw extruder. Thereafter, the mixture was pelletized with a pelletizer to obtain pellets of a polycarbonate resin composition. The pellets were dried at 110° C. for 10 hours.

Subsequently, the dried polycarbonate resin composition pellets were fed to an injection molding machine (Type J75EII, manufactured by The Japan Steel Works, Ltd.), and an operation for forming an injection-molded piece of a given size under the conditions of a resin temperature of 220° C. and a molding cycle of 23 seconds was repeated. The injection-molded pieces obtained by the 10th shot to the 20th shot were examined for various properties, etc. by the evaluation methods described above. The results obtained are shown in Table 2.

Example 2-2

The same procedure as in Example 2-1 was conducted, except that "Macrolex Blue RR" and "Macrolex Violet 3W" were added as bluing agents in place of the "Macrolex Violet B" in the proportions shown in Table 2 and that no antioxidant was added. The polycarbonate resin composition obtained was evaluated for various properties, etc. The results obtained are shown in Table 2.

Example 2-3

The same procedure as in Example 2-1 was conducted, except that "Macrolex Blue RR" was added as a bluing agent in place of the "Macrolex Violet B" in the proportion shown in Table 2. The polycarbonate resin composition obtained was evaluated for various properties, etc. The results obtained are shown in Table 2.

Example 2-4

The same procedure as in Example 2-1 was conducted, except that hindered-amine stabilizer "Tinuvin 765" was added in place of the antioxidants in the proportion shown in Table 2. The polycarbonate resin composition obtained was evaluated for various properties, etc. The results obtained are shown in Table 2.

Example 2-5

The same procedure as in Example 2-1 was conducted, except that "Macrolex Violet B" was used in the amount shown in Table 2. The polycarbonate resin composition obtained was evaluated for various properties, etc. The results obtained are shown in Table 2.

Comparative Example 2-1

The same procedure as in Example 2-1 was conducted, except that the bluing agent "Macrolex Violet B" was not added. The polycarbonate resin composition obtained was evaluated for various properties, etc. The results obtained are shown in Table 2.

Comparative Example 2-2

Pellets of PC2 were fed to a twin-screw extruder equipped with vents and having a set barrel temperature of 280° C. "Macrolex Blue RR" and "Macrolex Violet 3R" were continuously added thereto as bluing agents in the proportions shown in Table 2 so as to result in the makeup shown in Table 2. Simultaneously therewith, low-molecular substances including phenol were removed under vacuum through the vents of the twin-screw extruder. Thereafter, the mixture was pelletized with a pelletizer to obtain pellets of a polycarbonate resin composition. The pellets were dried at 120° C. for 10 hours.

Subsequently, the dried polycarbonate resin composition pellets were fed to an injection molding machine (Type J75EII, manufactured by The Japan Steel Works, Ltd.), and an operation for forming an injection-molded piece of a given size under the conditions of a resin temperature of 280° C. and a molding cycle of 23 seconds was repeated. The injection-molded pieces obtained by the 10th shot to the 20th shot were examined for various properties, etc. by the evaluation methods described above. The results obtained are shown in Table 2.

Comparative Example 2-3

The same procedure as in Comparative Example 2-2 was conducted, except that hindered-amine stabilizer "Tinuvin 765" was added. The polycarbonate resin composition obtained was evaluated for various properties, etc. The results obtained are shown in Table 2.

Comparative Example 2-4

The same procedure as in Example 2-1 was conducted, except that PC3 was used in place of the PC1. The results obtained are shown in Table 2.

TABLE 2

| | | | Example 2-1 | Example 2-2 | Example 2-3 | Example 2-4 | Example 2-5 | Comparative Example 2-1 | Comparative Example 2-2 | Comparative Example 2-3 | Comparative Example 2-4 |
|---|---|---|---|---|---|---|---|---|---|---|---|
| Formulation for polycarbonate resin composition (parts by weight) | Polycarbonate resin | PC1 | 100 | 100 | 100 | 100 | 100 | 100 | | | |
| | | PC2 | | | | | | | 100 | 100 | |
| | | PC3 | | | | | | | | | 100 |
| | Bluing agent 1 | Macrolex Violet B | $1.0 \times 10^{-4}$ | | | $1.0 \times 10^{-4}$ | $1.3 \times 10^{-4}$ | | | | $1.0 \times 10^{-4}$ |
| | Bluing agent 2 | Macrolex Blue RR | | $0.5 \times 10^{-4}$ | $2.0 \times 10^{-4}$ | | | | $0.5 \times 10^{-4}$ | $0.5 \times 10^{-4}$ | |
| | Bluing agent 3 | Macrolex Blue 3R | | $0.5 \times 10^{-4}$ | | | | | $0.5 \times 10^{-4}$ | $0.5 \times 10^{-4}$ | |
| | Antioxidant 1 | Irganox 1010 | 0.1 | | 0.1 | | 0.1 | 0.1 | | | 0.1 |
| | Antioxidant 2 | Irgafos 168 | 0.05 | | 0.05 | | | 0.05 | | | 0.05 |
| | Hindered-amine stabilizer | Tinuvin 765 | | | | 0.05 | | | | 0.05 | |
| Evaluation results | b* | | 0.35 | 0.66 | 0.20 | 0.54 | −0.02 | 1.06 | 0.46 | 0.54 | 0.80 |
| | L* | | 96.35 | 96.48 | 96.26 | 96.32 | 96.15 | 96.93 | 96.13 | 96.12 | 96.05 |
| | Retention of reduced viscosity (%) | | 100 | 99 | 99 | 97 | 99 | 100 | 94 | 82 | 97 |
| | Haze (%) | Before sunshine weatherometer irradiation test | 0.39 | 0.34 | 0.41 | 0.31 | 0.40 | 0.37 | 0.54 | 0.51 | 0.40 |
| | | After sunshine weatherometer irradiation test | 9.31 | 8.76 | 9.44 | 5.58 | 9.40 | 9.27 | 80.71 | 85.66 | 10.44 |
| | Pencil hardness | | F | F | F | F | F | F | 3B | 3B | F |

Note:
Each blank in the table indicates nonuse (amount used = 0).

As shown in Table 2, it was found that the polycarbonate resin compositions of the invention, which each included a polycarbonate resin (A) and a given amount of one or more bluing agents, had excellent hydrolytic resistance, were inhibited from taking a color, and had high lightness. Furthermore, it was found that the molded polycarbonate resin articles of the invention obtained from the polycarbonate resin compositions of the invention further had high surface hardness.

While the invention has been described in detail and with reference to specific embodiments thereof, it will be apparent to one skilled in the art that various changes and modifications can be made therein without departing from the spirit and scope thereof. This application is based on a Japanese patent application filed on Jun. 25, 2010 (Application No. 2010-145094), a Japanese patent application filed on Mar. 1, 2011 (Application No. 2011-043989), and a Japanese patent application filed on Mar. 28, 2011 (Application No. 2011-069428), the contents thereof being incorporated herein by reference.

INDUSTRIAL APPLICABILITY

The polycarbonate resin compositions of the invention are excellent in terms of transparency, hue, heat resistance, moldability, and mechanical strength, and polycarbonate resin compositions which further have excellent optical properties can be stably produced. It is possible to provide materials to a wide range of fields including the field of injection molding for producing electrical and electronic parts, automotive parts, and the like, the field of films and sheets, the field of bottles and containers in which heat resistance is required, lens applications such as camera lenses, finder lenses, and lenses for CCDs or CMOSs, films or sheets for use in liquid-crystal or plasma displays or the like, such as retardation films, diffusion sheets, and polarizing films, optical disks, optical materials, optical parts, and binder applications for fixing pigments, charge transfer agents, or the like.

The invention claimed is:

1. A polycarbonate resin composition which contains 100 parts by weight of a polycarbonate resin (A) at least containing structural units derived from a dihydroxy compound having the portion represented by the following formula (1) as part of the structure thereof and $0.1 \times 10^{-4}$ to $10.0 \times 10^{-4}$ parts by weight of a bluing agent, wherein a molded object (thickness, 3 mm) formed from the polycarbonate resin composition has a yellowness index (YI) value, as determined through an examination of transmitted light in accordance with ASTM D1925-70, of 12 or less after having undergone a 100-hour irradiation treatment with a metal halide lamp at an irradiance for the wavelength range 300-400 nm of 1.5 kW/m² in an environment having a temperature of 63° C. and a relative humidity of 50%,

(1)

wherein where the portion represented by the general formula (1) constitutes —CH$_2$—O—H is excluded, and
wherein the total amount of compounds of sodium, potassium, and cesium in the polycarbonate resin is 1 weight ppm or less, in terms of metal amount.

2. The polycarbonate resin composition as claimed in claim 1 wherein the dihydroxy compound having the portion represented by the formula (1), from which structural units contained in the polycarbonate resin (A) are derived, is a dihydroxy compound represented by the following formula (2) and the content of the structural units derived from the dihydroxy compound represented by the formula (2) is 15% by mole or higher but less than 90% by mole based on all structural units in the polycarbonate resin (A) each derived from a dihydroxy compound

[Chem. 2]

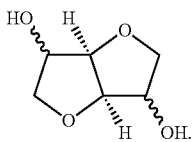
(2)

3. A polycarbonate resin composition which contains a polycarbonate resin (A) containing structural units derived from a dihydroxy compound represented by the following formula (2) as part of the structure thereof and further contains a bluing agent, wherein a molded object having a thickness of 2 mm formed from the polycarbonate resin composition has a b* value of −1 to 1 and an L* value of 96.15 or larger, and
wherein the total amount of compounds of sodium, potassium, and cesium in the polycarbonate resin is 1 weight ppm or less, in terms of metal amount,

[Chem. 3]

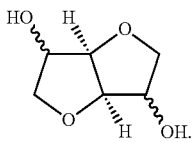
(2)

4. The polycarbonate resin composition as claimed in claim 1 or 3 wherein the bluing agent is a dye which has an absorption maximum wavelength of 520-600 nm.

5. The polycarbonate resin composition as claimed in claim 1 or 3 wherein the bluing agent is a compound represented by the following formula (3)

[Chem. 4]

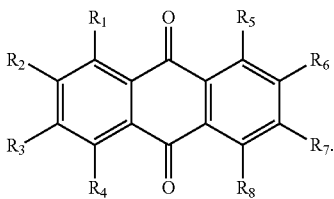
(3)

wherein in the formula (3), $R_1$ to $R_8$ each independently represent a hydrogen atom, a halogen atom, a hydroxyl group, an alkyl group having 1-3 carbon atoms, or an amino group which may have a substituent selected from the group consisting of alkyl groups and aryl groups.

6. The polycarbonate resin composition as claimed in claim 1 or 3 which contains a hindered-amine stabilizer in an amount of 0.0001-1 part by weight per 100 parts by weight of the polycarbonate resin (A).

7. The polycarbonate resin composition as claimed in claim 1 or 3 which contains an antioxidant in an amount of 0.0001-1 part by weight per 100 parts by weight of the polycarbonate resin (A).

8. A molded polycarbonate resin article obtained by molding the polycarbonate resin composition as described in claim 1 or 3.

9. The polycarbonate resin composition as claimed in claim 1 wherein the YI value is 7 or less.

10. The polycarbonate resin composition as claimed in claim 1 wherein the YI value is 5 or less.

11. The polycarbonate resin composition as claimed in claim 1 wherein the absolute value of the difference in YI value between before and after said irradiation with a metal halide lamp is 6 or less.

12. The polycarbonate resin composition as claimed in claim 1 wherein the absolute value of the difference in YI value between before and after said irradiation with a metal halide lamp is 4 or less.

13. The polycarbonate resin composition as claimed in claim 1 wherein the absolute value of the difference in YI value between before and after said irradiation with a metal halide lamp is 3 or less.

14. The polycarbonate resin composition as claimed in claim 3 wherein the b* value is −0.7 to 0.7.

15. The polycarbonate resin composition as claimed in claim 3 wherein the b* value is −0.5 to 0.5.

16. The polycarbonate resin composition as claimed in claim 3 wherein the L* value is 96.20 or larger.

17. The polycarbonate resin composition as claimed in claim 3 wherein the L* value is 96.30 or larger.

18. The polycarbonate resin composition as claimed in claim 1 wherein the structures derived from the dihydroxy compound having the portion represented by the general formula (1) as part of the structure thereof is contained in the polycarbonate resin (A) in amount which is 20-70% by mole, based on all structural units each derived from a dihydroxy compound.

19. The polycarbonate resin composition as claimed in claim 3 wherein the structures derived from the dihydroxy compound having the portion represented by the general formula (1) as part of the structure thereof is contained in the polycarbonate resin (A) in amount which is 20-70% by mole, based on all structural units each derived from a dihydroxy compound.

20. The polycarbonate resin composition as claimed in claim 1 or 3 which is produced in the presence of a Group-2 metal compound as a polymerization catalyst.

* * * * *